(12) United States Patent
Olson

(10) Patent No.: US 9,489,397 B1
(45) Date of Patent: Nov. 8, 2016

(54) IMPACT DATA MANAGER FOR DYNAMIC DATA DELIVERY

(75) Inventor: Douglas A. Olson, Rosemount, MN (US)

(73) Assignee: AON BENFIELD GLOBAL, INC., Chicago, IL (US)

(*) Notice: Subject to any disclaimer, the term of this patent is extended or adjusted under 35 U.S.C. 154(b) by 388 days.

(21) Appl. No.: 13/493,095

(22) Filed: Jun. 11, 2012

Related U.S. Application Data

(60) Provisional application No. 61/512,390, filed on Jul. 27, 2011.

(51) Int. Cl.
G06F 17/30 (2006.01)

(52) U.S. Cl.
CPC .............. G06F 17/30241 (2013.01)

(58) Field of Classification Search
CPC ................................ G06F 17/30241
See application file for complete search history.

(56) References Cited

U.S. PATENT DOCUMENTS

| | | | |
|---|---|---|---|
| 8,554,932 B1 * | 10/2013 | Leong et al. | 709/229 |
| 2003/0149657 A1 | 8/2003 | Reynolds et al. | |
| 2007/0214023 A1 * | 9/2007 | Mathai et al. | 705/4 |
| 2008/0133300 A1 | 6/2008 | Jalinous | |
| 2010/0280755 A1 * | 11/2010 | Pillsbury et al. | 702/2 |
| 2012/0123806 A1 * | 5/2012 | Schumann, Jr. | G08G 1/096775 705/4 |
| 2014/0019171 A1 | 1/2014 | Koziol | |

\* cited by examiner

*Primary Examiner* — Dinku Gebresenbet
(74) *Attorney, Agent, or Firm* — Oblon, McClelland, Maier & Neustadt, L.L.P.

(57) ABSTRACT

Techniques for dynamic delivery of client-indicated source data to an impact-on-demand or mapping system include a dynamic data delivery module configured to automatically transform the source data into a format that is compatible with the mapping system, validate at least a portion of the source data, and cause the transformed, validated source data to be delivered to the mapping system for storage in a client portfolio. The mapping system may, in real-time, map the client portfolio with impact events to determine risk exposure. The transformation may be based on one or more rules corresponding to the mapping system, and multiple original source data formats may be automatically transformed into the target format. The dynamic data delivery module may automatically correct or adjust source data contents or format to mitigate any anomalies or errors discovered during the transformation and/or validation processes.

24 Claims, 18 Drawing Sheets

Portfolio Management - Impact Data Manager: New Portfolio Wizard - Flat File Data Source

Impact Data Manager

File name: D:\Profiles\sanderson\Desktop\Test\EVoDSampleUSLargeDataSet.txt  [Refresh Preview]

Code page: Western European

| UniqueID | PolicyNumber | NumLocs | InPolicy | AttachPoint | PolicyPremium | PolicyDeductible | LocationLimit | Construc |
|---|---|---|---|---|---|---|---|---|
| 51160 | SAM-51160 | 3 | 0 | 1248 | 1000 | 28000 | 1 | HOME 9918 W 1200 N    NAPPANEE |
| 51161 | SAM-51161 | 8 | 0 | 631 | 250 | 1000 | 1 | HOME 4213 N HODGE RD STERLING |
| 51162 | SAM-51162 | 8 | 0 | 631 | 250 | 18000 | 1 | HOME 4213 N HODGE RD STERLING |
| 51163 | SAM-51163 | 8 | 0 | 631 | 250 | 900 | 1 | HOME 4213 N HODGE RD STERLING |
| 51164 | SAM-51164 | 8 | 0 | 631 | 250 | 500 | 0 | HOME 4213 N HODGE RD STERLING |

File Delimite

○ Comma  ○ Tab  ○ Semicolon  ○ Other [  ]

Text qualifier: None    ☑ First row has column names

| UniqueID | PolicyNu |
|---|---|
| 51160 | SAM-51160 |
| 51161 | SAM-51161 |
| 51162 | SAM-51162 |
| 51163 | SAM-51163 |
| 51164 | SAM-51164 |
| 51165 | SAM-51165 |
| 51166 | SAM-51166 |
| 51167 | SAM-51167 |
| 51168 | SAM-51168 |
| 51169 | SAM-51169 |
| 51170 | SAM-51170 |
| 51171 | SAM-51171 |

[<< Back]  [Next >>]

Portfolio Management - Impact Data Manager: New Portfolio Wizard - Flat File Data Source

Impact Data Manager    372

□New ⌴Open ⌴Save ⌴Save As ⌴Explorer | ⊕Add Column ⌴Edit Custom Column ⊗Delete Column

358

Source - Destination Mapping

Portfolio columns:

| # | Client Column Name | Server Column Name | Server Column Type |
|---|---|---|---|
| 10 | CITY | CITY | nvarchar |
| 11 | COUNTY | COUNTY | nvarchar |
| 12 | STATE | STATE | nvarchar |
| 13 | POSTALCODE | POSTALCODE | nvarchar |
| 14 | ADDRMATCH | ADDRMATCH | int |
| 15 | AddrMatchDesc | AddrMatchDesc | nvarchar |
| 16 | latitudet | latitudet | decimal |
| 17 | longitude | longitude | decimal |
| 18 | ALL | ALL | money |
| 19 | BookID | BookID | int |

Properties:

| Field Properties | |
|---|---|
| Size | 15,12 |
| Format | |
| Min value | -180 |
| Max value | 180 |
| Default value | |
| Allow nulls | ☑ |

Validation

368

Rule: Latitude, Longitude required    [Validate]

1 Error(s) found:
Row [18, longitude]: required field "Longitude" must have Length="18,12"

375

378

[<< Back]  [Next >>]

FIG. 2I

Portfolio columns:

| # | Client Column Name | Server Column Name | Server Column Type |
|---|---|---|---|
| 2 | NumLocsInPolicy | NumLocsInPolicy | int |
| 3 | AttachPoint | AttachPoint | int |
| 4 | PolicyPremium | PolicyPremium | int |
| 5 | PolicyDeductible | PolicyDeductible | datetime |
| 6 | LocationLimit | LocationLimit | decimal |
| 7 | Construction | Construction | float |
| 8 | LOB | LOB | int |
| 9 | Address | Address | money |
| 10 | CITY | CITY | nvarchar |
| 11 | COUNTY | COUNTY | nvarchar |

IMPACT DATA MANAGER FOR DYNAMIC DATA DELIVERY

CROSS-REFERENCES TO RELATED APPLICATIONS

The present application claims the benefit of U.S. Provisional Application No. 61/512,390 entitled "Impact Data Manager," which was filed on Jul. 27, 2011, the entire disclosure of which is hereby incorporated by reference.

TECHNICAL FIELD

The present disclosure generally relates to systems and methods of managing the collection and organization of data used in a risk insight and catastrophic event mapping application.

BACKGROUND

Insurance providers generally monitor and track risk events such as hurricanes, earthquakes, tornadoes, wildfires, riots, unrest, hail events, volcanic eruptions, etc. that impact their products (e.g., insurance policies). A system of monitoring events that affect the state of a set of insurance policies may include an application that provides mapping of risk event related data based on information collected from multiple sources. Thus, for example, where a tornado is occurring or has occurred, data on the tornado event may be mapped to a geographic area. In this manner, an insurance provider or other interested party may be able to visualize and gauge its risk exposure via a map. Such a system may be called a mapping system or an impact-on-demand system.

A data collection and data management component may be implemented to manage data upon which the impact-on-demand system operates. For example, a worthwhile feature of such an event/risk mapping system may be the ability to accumulate and incorporate new data relating to the event from multiple sources in an efficient manner to enable basic mapping features such as on-demand report generation. However, managing the received data from multiple disparate sources having different formats can be difficult. Moreover, creating certain views based on dynamic data acquisition may require ad-hoc or on-the-fly re-organization of data. Further, in a system in which available data combinations are changing, an efficient process may be needed to recognize when certain fields or combinations of fields are available so that further data manipulation can be more efficient.

SUMMARY

Embodiments of a system for delivering source data to an impact-on-demand or mapping system include a dynamic data delivery module stored on a non-transitory, tangible computer storage medium, a link that communicatively connects the dynamic data delivery module to the mapping system, and a data storage entity storing one or more rules corresponding to the mapping system. The dynamic data delivery module may be configured to automatically transform the source data from a first format into a second format, where the second format is compatible with the mapping system. The dynamic data delivery module may be further configured to perform a validation of at least a portion of the source data based on at least one of the rules corresponding to the mapping system, and to cause the transformed, validated source data to be delivered, via the link, to the mapping system to be stored in a client portfolio. The mapping system may be configured to receive the transformed, validated source data from the dynamic data delivery module, store the data in a client portfolio, and geographically map contents of the client portfolio and impact events to determine risk exposure.

Embodiments of a method of delivering source data to an impact-on-demand or mapping system include receiving, from the mapping system, one or more rules corresponding to one or more client portfolios stored at said mapping system. The method may also include automatically transforming, based on at least one of the rules, client-indicated source data from a first format into a second format. The method may additionally include performing a validation of at least a portion of said source data in said first format or in said second format, and causing the transformed, validated source data to be delivered to the mapping system for mapping with one or more impact events for risk exposure analysis or for other mapping system functionality. Outputs of the mapping system that are based on the transformed, validated source data may be displayed at a local or remote user interface in real-time.

Embodiments of a system for delivering source data to an impact-on-demand or mapping system may include a dynamic data delivery module. The dynamic data delivery module may have a first communicative connection to a user interface and a second communicative connection to the impact-on-demand or mapping system. The mapping system may be configured to receive the source data from said dynamic data delivery module and to geographically map contents of the source data and impact events to determine risk exposure. The dynamic data delivery module may be configured to be executed by a processor to receive an indication of a user selection of source data in a first format, transform said source data in said first format into a second format compatible with said mapping system, and perform a validation of at least a portion of said source data in said first format or in said second format. The dynamic data delivery module may further be configured to cause the transformed, validated source data to be delivered to the mapping system to be stored in a client portfolio. The mapping system may perform mapping functionality on the source data and one or more impact events, and may return an output to the dynamic data delivery module for display on the user interface, in an embodiment. When the output is generated per a user request, the output may be generated by the mapping system and returned to the dynamic data delivery module in real-time.

BRIEF DESCRIPTION OF SEVERAL VIEWS OF THE DRAWINGS

FIGS. 2A-2L include example screen shots illustrating a set of example interactions between a user and a front end of the mapping or impact-on-demand system to deliver source data to a back end of the mapping or impact-on-demand system;

DETAILED DESCRIPTION

Figure 1:
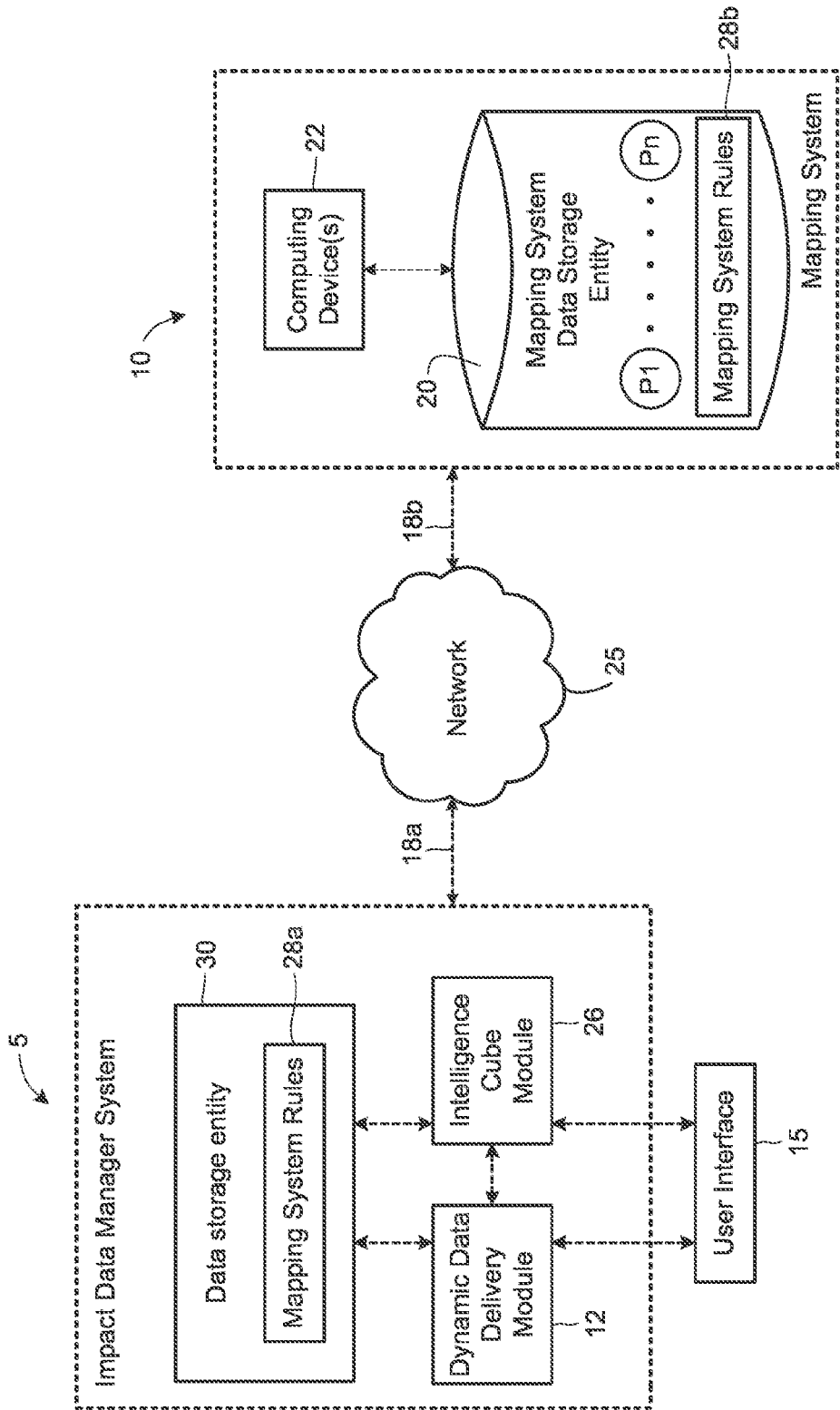
FIG. 1 is a block diagram of an example system for delivering source data to a mapping or impact-on-demand system, such as for storage in a portfolio at the mapping or impact-on-demand system.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

An impact-on-demand system (also referred to interchangeably herein as a "mapping system," an "exposure system," or a "risk management system") generally maps parameters of an impact event to a particular location or geographical area and provides an indication of risk exposure for the particular location or geographical area. Typically, but not necessarily, the risk exposure may be indicated using a map, a chart, a report or other suitable indication. An "impact event" may be any catastrophic event. For example, an impact event may be a weather-related event such as a storm, hurricane, earthquake, tornado, hail storm, volcanic eruption, etc. An impact event may be a natural or man-made disaster such as a wildfire or a flood caused by a dam break. In some situations, an impact event may be societal in nature, such as a riot, terrorism act, or civil unrest. Generally, an impact event may be any risk event that has an ability to impact or affect a physical or geographical area, and, as such, may have an ability to impact or affect real property and/or other insurable or insured properties of interest situated in or around the physical or geographical area.

A client, user or other interested party of the impact-on-demand or mapping system may create or define one or more client portfolios that indicate specific physical or geographical areas of particular interest to the client. In some instances, client portfolios may include indications of real property or other insurable or insured properties of interest to the client where the property is located in, on or by the specific physical or geographical areas (e.g., buildings, factories, farm land, waterways, forests, or other tangible fixed or natural capital). The impact-on-demand or mapping system may provide, as at least a portion of its output, an indication of existing and/or predicted risk to one or more client portfolios as related to one or more impact events. In an example, the impact-on-demand or mapping system may provide a visual map that tracks the impact event over time with respect to a particular client portfolio, and/or the impact-on-demand or mapping system may provide on-demand reports corresponding to the impact event and the client portfolio. Reports may include, for example, predicted or estimated loss, damage, replacement costs, and the like. In some embodiments, output of the impact-on-demand system may be provided to the user on request. In some embodiments, upon user request, the output of the impact-on-demand system may be provided to the user in real-time.

As such, a client, user or other interested party may utilize the impact-on-demand or mapping system to better assess the risk of the one or more impact events for risk management or other purposes. The terms "client," "user" and "interested party" of the impact-on-demand or mapping system are used interchangeably herein to refer to a receiver of information (e.g., maps, reports, and other information) that is provided by the impact-on-demand or mapping system. The client may be a computing device, or the client may be a human user of a computing device. In some scenarios, a human client (or the company or organization with which the human client is associated) may have a business relationship with the provider of the impact-on-demand or mapping system, although this is not necessary. In one non-limiting example, a client may be a primary insurance company or a department of an insurance company such as management, product management group, claims department, underwriting department, etc. In another example, the client may be a government disaster or emergency response organization. Other examples of clients that have business or working relationships with the provider of the impact-on-demand system may be possible.

The techniques described herein include systems and methods of managing, organizing and delivering source data from a client to enable the impact-on-demand system to generate various different risk mapping functionalities and efficiencies. In an embodiment, the source data may be delivered from a client for inclusion in a client portfolio that is stored at the impact-on-demand or mapping system. The term "source data," as used herein, generally refers to data of interest to the client that is provided to the mapping or impact-on-demand system for generating its output, e.g., maps, reports, risk management assessments, and the like. For example, the source data may include data pertaining to real property or other insurable or insured properties of interest to the client that are located in, on or by the specific physical or geographical areas (e.g., buildings, factories, farm land, waterways, forests, or other tangible fixed or natural capital). Typically, but not necessarily, the source data may include an indication of a geographical location corresponding to the property of interest to the client.

The source data for delivery to the impact-on-demand system may be indicated by the client, and may be obtained from a data file. Alternatively or additionally, the source data may be provided by the client via direct input. In some scenarios, at least some of the source data may include data that is provided by a party other than the client (such as a database or file that is generated by a third-party). In some scenarios, at least a portion of the source data may include existing client portfolio data (e.g., data that has been previously incorporated into a client portfolio), such as when the client desires to modify existing client portfolio data. The source data may be entered or provided by a client of the impact-on-demand or mapping system at an impact data manager (also referred to herein interchangeably as an "impact data manager system").

Generally, the techniques described herein may be implemented by an impact data manager in communicative connection with the impact-on-demand or mapping system. As such, the impact data manager may be considered to be a "front-end component," and the mapping system may be considered to be a "back-end component." In some embodiments, more than one impact data manager may be in communicative connection with the impact-on-demand or mapping system, such as in scenarios where multiple clients use the impact-on-demand system and each impact data manager services a different client.

FIG. 1 illustrates a block diagram of an example impact data manager 5 front-end in communicative connection with a mapping or impact-on-demand system 10 back-end. The impact data manager 5 may be configured to dynamically deliver source data to the mapping or impact-on-demand system 10. An example mapping or impact-on-demand system including front and back ends may be the ImpactOnDemand® platform developed by Aon Benfield, Inc. The ImpactOnDemand platform includes an ImpactManager, which is one of many possible examples of an impact data manager 5 front-end.

In some embodiments, the impact data manager 5 may include a dynamic data delivery module 12 that is accessible to a user via a user interface 15, and that is configured to dynamically deliver source data to the mapping or impact-on-demand system 10. In an embodiment, the system 5 may reside on one or more computing devices whose user interface 15 is directly utilized by a user (e.g., via a keyboard, mouse, screen, voice commands, etc.).

In another embodiment, the impact data manager system 5 may be remotely situated from the user and may reside on one or more remote computing devices, servers, cloud computing devices, etc. In this embodiment, the system 5 may be accessible to the user via a user interface 15 of a device that is directly and locally accessible to the user (e.g., a laptop, desktop, wireless device, smart device, etc.) and that is in communicative connection with the system 5. For example, the user interface 15 may include via a rich client (e.g., an executable program) that communicates through a network (not shown) with the impact data manager system 5. The network between the user interface 15 and the impact data manager system 5 may be a private network, a public network (e.g., the Internet), or some combination of public and private networks.

As illustrated in FIG. 1, the dynamic data delivery module 12 of the impact data manager system 5 may be communicatively connected to the mapping or impact-on-demand system 10 by one or more links 18a, 18b. FIG. 1 illustrates the impact data manager system 5 and the mapping system 10 as being communicatively connected by the links 18a, 18b through a network 25. The network 25 may be, for example, a private network, a public network (e.g., the Internet), or some combination of public and private networks. In some embodiments, though, the impact data manager system 5 and the mapping system 10 need not be communicatively connected through any network, and instead may be locally connected, e.g., when the impact data manager system 5 and the mapping system 10 reside on a same bank of servers or computing devices.

The impact-on-demand system 10 back-end may include a mapping system data storage entity 20 that is accessible to one or more computing devices 22. The mapping system data storage entity 20 may store one or more client portfolios P1-Pn. Each of the client portfolios may indicate a set of properties or geographical locations that are of interest to a client for mapping purposes. For example, a client portfolio may indicate a set of insured real properties in a specific geographical area. In an embodiment, a client portfolio may include any data that may be visualized on a map including, but not limited to data corresponding to weather patterns, terror targets, offshore oil platforms, sinkhole locations, fire stations, migrations of crowds of people (e.g., during rallies, protests, etc.), and other data. Generally, contents of each client portfolio P1-Pn may be defined by a client. The mapping system data storage entity 20 may store multiple portfolios corresponding to one or more clients, in an embodiment.

Although the embodiment shown in FIG. 1 illustrates the data storage entity 20 as being locally accessible to the one or more computing devices 22 of the mapping system 10, in some embodiments, the data storage entity 20 may be remotely accessed by the one or more computing devices 22 via a link and a network (not shown) such as a private network, a public network (e.g., the Internet), or some combination of public and private networks. The mapping system data storage entity 20 may include one or more data storage devices of any known non-transitory, tangible storage media technology (e.g., disks, solid state devices, data banks, servers, cloud storage, etc.) that appear and operate as a single logical data storage device 20. Similarly, the one or more computing devices 22 may include one or more networked computing devices (e.g., stand-alone computing device, one or more servers, cloud computing devices, and the like) that appear and operate as a single logical computing device 22. Each of the one or more computing devices 22 may include a processor, a non-transitory program memory storing computer-executable instructions, a non-transitory random-access memory (RAM), and one or more communication links.

Returning to the impact data manager 5 at the front-end, the dynamic data delivery module 12 may include a set of computer-executable instructions stored on one or more non-transitory, tangible computer-storage media such as a non-transitory memory storage device. The computer-executable instructions may be executable by one or more processors. The one or more processors and the one or more computer-storage media on which the dynamic data delivery module 12 is stored may or may not reside in a same physical computing device. In a non-limiting embodiment, the one or more processors may be included in a first set of computing devices, and the one or more computer-storage media may be included in a second set of computing devices. Generally, the computer-executable instructions of the dynamic data delivery module 12, when executed by one or more processors, may allow for dynamic selection, preparation and upload of source data for inclusion in a client portfolio stored at the mapping system 10. Additionally, the computer-executed instructions of the dynamic data delivery module 12, when executed by the one or more processors, may allow for a user to interface with the impact data manager 5 during the dynamic preparation and upload of the source data.

In some embodiments, the dynamic data delivery module 12 may be communicatively connected with one or more other modules included in the impact data manager 5. For example, the dynamic data delivery module 12 may be coupled to an intelligence cube module 26 for remotely generating dynamic intelligence cubes from the mapping system 10, such as described in U.S. patent application Ser. No. 13/493,100 entitled "Impact Data Manager for Generating Dynamic Intelligence Cubes" filed the same day as the present application, and the entire disclosure of which is hereby incorporated by reference. The generated intelligence cubes may be used in excising information from one or more client portfolios P1-Pn for use in reports and other intelligence tools. Similar to the dynamic data delivery module 12, the intelligence cube module 26 and/or any other modules may each be communicatively connected to the user interface 15 and to a data storage entity 30 of the impact data manager system 5.

The dynamic data module 12 may automatically transform, convert or map, based on one or more rules corresponding to the mapping system 10, client-indicated source data from at least one first format into a second format, where the second format is compatible with the mapping system 10. In an embodiment, the client-indicated source data may correspond to a set of insured or insurable properties and/or to a set of tangible resources or capital. The source data may include indications of one or more physical or geographical locations, such as indications of geographical areas or locations of real properties. The indications of the one or more physical or geographical locations may include indications of geo-spatial coordinates, such as latitude, longitude and/or altitude, in an embodiment. The location indications may include at least a portion of a mailing or postal address (e.g., ISO3 Country, Street Address, City, State, Postal Code, etc.), in an embodiment. In another embodiment, the location indications may include satellite navigation coordinates or ranges thereof such as GPS (Global Positioning System) coordinates, or coordinates of other satellite navigation systems (e.g., GLONASS (Russian Global Navigation Satellite System, European Union Galileo positioning system, Chinese Compass navigation system, Indian Regional Navigational Satellite System, etc.). The source data may additionally or alternatively include location indications using other data types, including but not limited to numeric, text, date, Boolean, user-defined data types, and other data types.

The source data may be client-generated or client-collected. For example, the client may populate at least a portion of a data file to include in the source data that is to be uploaded or delivered from the impact data manager system 5 to the mapping system 10. In some instances, some portion of the source data may be collected or obtained from a third party. For example, the client may retrieve geospatial coordinates from another database or application to include in a source data file for upload or delivery to the impact-on-demand system 10.

The first format or original format of the source data may be any format in which data may be stored or represented, including but not limited to plain text, delimited text, fixed length fields, databank format, dif format, and the like. In some embodiments, the first format may be a database format compatible with a commercial or industry standard format, for example Microsoft® Access, Microsoft Excel, dBASE™, VisiCalc, SQL (Standard Query Language), and/or any other database format. The source data may include data of more than one format, for example, when the client collects or enters the source data from various different sources or files.

The dynamic data delivery module 12 may perform a validation or verification on the source data prior to delivering the source data to the mapping system 10. The validation or verification may be based on one or more rules 28a corresponding to the mapping system 10. The rules 28a may indicate a set of characteristics, limits and/or boundary conditions of data fields and/or contents of data fields corresponding to the second format or target format, so that data in the second format will be understood by or will be compatible with the mapping system 10 for storage in a portfolio. As such, the set of rules 28a may be referred to interchangeably herein as a set of "portfolio rules," "mapping rules," or "mapping system rules."

The set of rules 28a may originate at the mapping system 10 (e.g., at the mapping system data storage entity 20), and in some embodiments, the set of rules 28b may be stored as a "master copy" at the mapping system 10. The mapping system 10 may deliver a copy 28a of at least a portion of the rules 28b to the client system 5 via the links 18a, 18b. For example, a copy 28a of at least some of the rules 28b may be downloaded or delivered by a suitable transfer mechanism, either automatically and/or per user request. In an embodiment, the mapping system 10 may deliver the copy of set of rules 28a (or may deliver an update to the set of rules 28a) in response to a request of the dynamic data delivery module 12. The copy of set of rules 28a may be locally stored at the impact data manager system 5 in a local data storage entity 30, so that the dynamic data delivery module 12 may access the rules 28a to perform transformation, validation and/or verification of the source data, or other tasks.

In an embodiment, the dynamic data delivery module 12 may perform the validation of the source data based on both the set of rules 28a and based on user input. For example, the user may elect a tighter boundary than allowed by the rules 28a, or the user may modify or make one or more exceptions to the rules 28a. In another example, the user may define an additional rule to use during the transformation, validation and/or verification processes.

In an embodiment, the validation process may determine whether or not the data fields of the source data and the contents therein are compatible with the second format or are able to be transformed or to be converted to be compatible with the second format. For example, if the presence of a particular data field is required in the second format so that the mapping system 10 may perform its functions, the validation process may determine whether or not the particular data field is present in the source data. In another example, if a data field in the second or target format requires a particular length or syntax, the validation process may determine whether or not the corresponding data field of the source data in the first or original format is able to be so transformed or converted.

In an embodiment, the validation process may include a numerical value validation, e.g., an evaluation of whether or not a value included in the source data falls within an expected range. Additionally or alternatively, the validation process may include a control total validation to cross-check values and totals across various dimensions of the source data (e.g., columns and rows, subsets, categories, and the like). Further, the validation process may include a geographical location validation, such as a validation of a longitude/latitude pair, a mailing address, or some other geographical location validation. For example, portions of a mailing address may be validated for cohesiveness, e.g., does the ZIP code correspond to the state, is the house or building number valid for the street, etc.

In an embodiment, during the validation process, the dynamic data delivery module 12 may determine an anomaly, inconsistency, or incompatibility. For example, the dynamic data delivery module 12 may determine a presence of an anomaly in a particular data field, such as when the particular data field is a keyed field or includes a reference that cannot be resolved at the mapping system 10. In another example, the dynamic data delivery module 12 may determine a discrepancy between the contents of two fields, such as a ZIP code that does not correspond to the indicated state. In yet another example, the dynamic data delivery module 12 may determine a numerical anomaly, such as a policy expiration date occurring before a policy inception date. In still yet another example, the dynamic data delivery module 12 may determine a field property anomaly, such as when the target format requires (for a particular data field) at least a field length of X and the original format uses a field length of Y, where Y is less than X. Other types of anomalies or discrepancies may be possible.

In an embodiment, the dynamic data delivery module 12 may automatically notify the user of any discrepancies or anomalies. In an embodiment, the dynamic data delivery module 12 may take corrective action or automatically adjust the source data to resolve the anomaly or inconsistency. For example, the dynamic data delivery module 12 may bring the anomaly to the user's attention via the user interface 15 and await a user response (e.g., "Keyed Field Detected in Input Data; Please Correct") without taking any corrective action. In some scenarios, the dynamic data delivery module 12 may provide a suggested corrective action along with the notification, and may await an indication of an approval from the user. In some embodiments, the dynamic data delivery module 12 may automatically perform corrections or adjustments without any user notification or input (e.g., synchronizing source data currency values that are represented by "int" data types and source data currency values that are represented by "char" data types into a common "money" data type, extending a field length, changing a field name from "Policy ID" to "Policy Number," etc.).

In some scenarios, the transformation or conversion from the first format to the second format may be a direct, rote translation from one exact format to another exact format. However, the techniques described herein are not so limited. In some embodiments, a source data file may include multiple different source data formats (e.g., multiple different "first formats"), and a single transformation of the source data file by the dynamic data delivery module 12 may convert data of multiple different source data formats included in the source data file to fit within the boundaries of the second format. As such, the rules 28a corresponding to the second or target format need not conform to a rigid syntax, but may be sufficiently flexible to accommodate the distinguishing characteristics of each different original source data format. Accordingly, multiple direct, rote translations need not be performed, and a client may easily upload source data from multiple different sources and formats to be processed by the mapping system 10 in a single transformation and validation process.

Once the source data has been validated or verified, in an embodiment, the dynamic data delivery module 12 may encrypt and/or compress the source data to further prepare the source data for delivery. Encryption and compression may be selectable, in an embodiment. The dynamic data delivery module 12 may cause the source data (whether encrypted or non-encrypted, and/or compressed or non-compressed) to be delivered to the mapping system 10 via the link 18a. In an embodiment, the source data may be delivered to the mapping system 10 via a proprietary delivery system. In an embodiment, direct uploading or delivery of source data to the impact-on-demand system 10 using the impact data manager 5 may be an automated process that uploads or delivers data on-demand from multiple sources for use with the mapping system 10.

The mapping system 10 may receive the source data from the impact data manager 5, and may store the source data in an indicated client portfolio. In an embodiment, the mapping system 10 may perform control total validation on the received source data, and may provide results of the control total validation to the client system 5 for a user to accept or decline. If the user accepts the control total validation, the source data received a the mapping system 10 may be published, and if the user declines the control total validation, the source data received at the mapping system 10 may be removed or deleted from the system 10. The mapping system 10 may perform one or more mapping functions on published data included in the client portfolio and one or more impact events.

Thus, as discussed above, the dynamic data delivery module 12 of the impact data manager 5 may automatically transform the source data from one or more original or first formats into a target or second format, where the second format comports with the requirements and boundaries of the mapping system 10. As such, the second format may enable functionality of the impact-on-demand system mapping system 10, and the dynamic data delivery module 12 may manipulate source data to fit the second format. The validity and format of the transformed, validated source data allows the mapping system 10 to perform mapping functionality in real-time, without being hindered by data incompatibilities and other anomalies or errors.

Some of the data fields of the second format may be designated as fields that are required at the mapping system 10 in order for the mapping system 10 to enable minimum functionality. Other required or recommended fields may be additionally or alternatively designated to enable full functionality in the impact-on-demand system 10. In embodiments where an impact-on-demand system 10 is flexible to allow for additional fields, all additional fields from a source dataset may be transformed into the second format for delivery to the impact-on-demand system 10. For the transformation of any additional fields, an intuitive naming standard for the additional fields may be used.

In an embodiment, to ensure base functionality of the impact-on-demand mapping system 10, a set of data fields may be designated as being required. That is, any source data that is transformed into the second format may be required to include at least the set of required data fields. Typically, the set of required data fields may indicate a physical, geographical or geo-spatial location to support Geo-Coding (in which geo-spatial data such as longitude and latitude are tagged to the raw source data).

A first example set of required data fields is listed below. The first example set below corresponds to mailing or postal addresses of target locations.

First Example Set of Required Data Fields (Address-Based)

Street Number—the Street Number data field may be populated with an indication of the street number corresponding to a location at which a risk is located. Special characters (i.e. #, /, &, *, etc.) may be extracted or eliminated from this field during the automatic transformation process, as well as any unnecessary information such as driving directions or insured names.

Street Name—the Street Name data field may be populated with an indication of the street name corresponding to a location at which a risk is located. Special characters (i.e. #, /, &, *, etc.) may be extracted or eliminated from this field during the automatic transformation process, as well as any unnecessary information such as driving directions or insured names.

Street Address—the Street Address data field may be populated with an indication of the street number and street name corresponding to a location at which a risk is located. Special characters (i.e. #, /, &, *, etc.) may be extracted or eliminated from this field during the automatic transformation process, as well as any unnecessary information such as driving directions or insured names. In some embodiments, if the Street Address field is included in the set of required data fields, the Street Name and Street Number fields may be eliminated from the required data set.

City—the City data field may be populated with an indication of the city in which the risk is located.

2-Digit State Abbreviation (ISO State Code/Abbreviation)—the International Organization for Standardization (ISO) for State Code/Abbreviation data field may be populated with an indication of the code or abbreviation corresponding to the location of the risk.

ZIP Code (9- or 5-digit) or Postal Code—In an embodiment, the ZIP Code data field may be populated with an indication of a 9-digit or 5-digit ZIP Code corresponding to the location of the risk. In an embodiment, all risks included in the source data must have at least a valid 5-digit ZIP Code. The ZIP Code field may be verified as to whether or not the ZIP code is valid within the state indicated by the ISO State Code/Abbreviation data field. In another embodiment, the field may be populated with an international Postal Code that corresponds to the country or area.

County Name—the County Name data field may be populated with an indication of the county in which the risk is located. The indication of the county may correspond to a FIPS (Federal Information Processing Standard) county code or may be an alphanumeric county name. In some embodiment, a CountyName is not required.

Of course, the first example required data set is not limited to only the above fields. In other embodiments, one or more other data fields may be added to or deleted from the first example set.

In some embodiments, instead of the set of required data fields being defined based on a mailing or postal address as discussed above, the set of required data fields may be based instead on other types of location or geographical identifiers, e.g., latitude/longitude pairs, GPS coordinates, or other suitable location identifiers. For example, a required set of data fields to support base functionality of the impact-on-demand system 10 may use geo-coding. In an embodiment, the dynamic data delivery module 12 may default to producing geo-coded fields during the automatic transformation of the source data into the second format. The geo-coded fields may be populated with data from the source data and/or from another source. Some of the geo-coded fields may be automatically populated by the impact data manager 5, in some scenarios. Thus, in an embodiment, if the source data in the first format includes pre-populated geo-coded fields, the impact data manager 5 may directly utilize the pre-populated geo-coded fields of the first format in the second format. In scenarios where one or more required geo-coded fields are not provided in the first format (e.g., when the source data includes postal addresses), the impact data manager 5 may automatically transform the source data into the desired geo-coded fields.

An example set of required data fields using geo-coding is listed below.

Second Example Set of Required Data Fields (Geo-Coding)

Latitude—the Latitude data field may be populated with an indication of a latitude value corresponding to the risk.

Longitude—the Longitude data field may be populated with an indication of a longitude value corresponding to the risk.

In some embodiments, other geo-coding fields may be included in the set of required data fields, e.g., "Altitude" or "Depth."

While the above described fields may be required to support a minimal mapping functionality of the mapping system 10, in some embodiments, one or more additional fields may be included in the transformed source data to enable additional functionality of the mapping system 10. For example, if the client includes additional data in the original source data beyond any required data, the impact data manager 5 may be configured, in an embodiment, to automatically determine the inclusion of the additional data and to automatically transform the additional data of the first format to be compatible with the second format.

The additional data fields may be used by the mapping system 10 for "look-ahead" technology or features, in an embodiment. For example, the mapping system 10 may analyze data fields and, based on the analysis, may dynamically make changes to the functionality and/or display choices available to the user. As such, if certain data exists within the data set, the mapping system 10 may cause extra "look ahead" functionality to be presented or executed. Examples of look-ahead features may include (but are not limited to) geo-coding (e.g., when the required data fields are addressed-based), thematic shading (e.g., geographical shading on a map based on county or other location), quick exposure calculations (e.g., detailed calculation of exposed limits for included data), risk analysis, single risk modeling, and the like.

In some embodiments, to support desired look-ahead features, the dynamic data delivery module 12 may determine if certain additional information needs to be included in the transformed source data, whether or not the additional information has been included by the client in the original source data. In these embodiments, the dynamic data delivery module 12 may automatically provide or enable extra menus, features, fields and calculations to generate populated data fields of the second format.

Examples of possible additional data fields are described below. For ease of reading, the example additional data fields are grouped into categories, but any number of additional data fields of zero, one, or more categories may be included in the automatic transformation performed by the dynamic data delivery module.

Examples of Optional Additional Data Fields:

POLICY TERMS

Policy Number—the Policy Number data field may be populated with an indication of an insurance policy identification (e.g., a number, an alphanumeric code, or similar). The Policy Number data field may be needed to identify multi-location policies, to generate policy averages and to calculate losses to individual policies that cover multiple locations. For a single location policy, the Policy Number data field may be populated as a unique number or identifier. For a multi-location policy, the Policy Number data field may be populated with a same number or identifier for all locations under the multi-location policy.

Policy Name—the Policy Name data field may be populated with an indication of a name associated with a policy.

Policy Premium—the Policy Premium data field may be populated with an indication of a direct written premium for policies in force as of the date of the source data or as of an indicated date.

Policy Limit—the Policy Limit data field may be populated with an indication of a policy limit for policies in force as of the date of the source data or as of an indicated date.

Line of Business—the Line of Business data field may be populated with a code indicating a particular line of business. Examples of Lines of Business may include commercial fire (including, in some instances, commercial extended coverage), dwelling fire (including, in some instances, personal extended coverage), homeowners, contents-only homeowners, mobile homeowners, commercial multi-peril, commercial inland marine, commercial auto, personal auto, farm owners, and other lines of businesses. The set of codes corresponding to lines of businesses may be programmable based on client.

Policy Inception Date—the Policy Inception Date data field may be populated with an indication of the effective date of policy coverage.

Policy Expiration Date—the Policy Expiration Date data field may be populated with an indication of the date on which coverage is set to expire unless renewed.

Risk Characteristics/Location Details

Square Footage—the Square Footage data field may be populated with an indication of the total square footage corresponding to real property associated with the risk. In an embodiment, the Square Footage data field may be populated with an indication of a value based on a personal lines policy.

Construction Class—the Construction Class data field may be populated with an indication of one or more structural properties corresponding to the risk.

Occupancy Type—the Occupancy Type data field may be populated with an indication of the general occupancy of the risk.

Year Built—the Year Built data field may be populated with an indication of the year of construction corresponding to the risk.

Number of Stories—the Number of Stories data field may be populated with a number of stories of a structure corresponding to the risk.

Number of Buildings (Risk Count)—if the source data is aggregated, the Number of Buildings data field may indicate a number of risks included in the aggregation. For policies corresponding to multiple buildings, the Number of Buildings data field may be populated with an indication of the number of building structures covered by the policies.

Peril Endorsements

Wind Endorsed—the Wind Endorsed data field may be populated with an indication of whether or not a policy is covered for windstorm loss. In an embodiment, a "Y" in this field may indicate the policy is covered for losses due to wind, while an "N" in this field may indicate no wind coverage.

Earthquake Endorsed—the Earthquake Endorsed data field may indicate whether or not a policy is endorsed with earthquake coverage. In an embodiment, a "Y" in this field may indicate the policy is covered for losses due to earthquake, while an "N" in this field may indicate no earthquake coverage.

Tornado and Hail Endorsed—the Tornado and Hail Endorsed data field may indicate whether or not a policy is endorsed with tornado hail coverage. In an embodiment, a "Y" in this field may indicate the risk is covered for losses due to tornado hail, while an "N" may indicate no tornado hail coverage.

Wildfire Endorsed—the Wildfire Endorsed data field may indicate whether or not a policy is endorsed with wildfire coverage. In an embodiment, a "Y" in this field may indicate the risk is covered for losses due to wildfire, while an "N" may indicate no wildfire coverage.

Data fields that represent other peril endorsements may be included as additional or alternative data fields. For example, other peril endorsements may include Flood, Worker Compensation, Terrorism, Winter Storm, and other perils.

Multi-Peril Capabilities

The impact-on-demand system 10 may be capable of receiving a source data file for two or more perils (e.g., one import file for more than one peril). Thus, site, coverage and other multi-peril capability values may be included for perils that are applicable to the source data. Each multi-peril capability data field may be respectively applied to each different peril, hence the descriptions of the capabilities herein do not refer to a specific peril. Examples of capabilities may include zero, one, or more of the following data fields:

Total Insured Value:

TIV (Total Insured Value)—the Total Insured Value data field may be populated with an indication of a total insured value of the location. For peril specific TIV values, an alphanumeric peril abbreviation may be added followed by an underscore before 'TIV' (for example: HU_TIV for a Hurricane peril, EQ_TIV for an Earthquake peril, TH_TIV for a Tornado Hail peril, etc.).

Location Details—Multi-Location Policies:

Location Name—The Location Name data field may be populated with an indication of a name or other identification of an individual location of a multi-location policy.

Location Number—the Location Number data field may be populated with an indication of a number to identify an individual location of a multi-location policy.

Location Premium—the Location Premium data field may be populated with an indication of a premium value of a location included in a multi-location policy.

Location Limit—the Location Limit data field may be populated with an indication of a limit value of a location included in a multi-location policy.

Layer Details:—the Layer Details data field(s) may include an attachment point of the policy, policy limit and layer amount.

Layer Limit—the Layer Limit data field may be populated with an indication of a layer limit. The value of the layer limit may be used by the mapping system 10, for example, in a capped limit calculation.

Attachment Point—the Attachment Point data field may be populated with an indication of the attachment point for the layer. The attachment point may be used by the mapping system 10, for example, in a capped limit calculation.

Capped Limit—the Capped Limit data field may be used for multi-location policies to determine a cumulative limit across multiple locations, e.g., for policy limits, attachment points, location limits, etc.

Participation Percent—the Participation Percent data field may be populated with an indication of a participation percent for the layer. The participation percent may be used by the mapping system 10, for example, in a capped limit calculation.

Site Limits and Deductibles:

Site Limit—the Site Limit data field may generally be populated with a total insured limit of the location when each location of a multi-location policy has a separate limit. In cases where the site limit equals the policy limit, the site limit may not be required.

Site Deductible—The Site Deductible data field may be populated to report a deductible value for each location of a multi-location policy. For single location policies, the Site Deductible data field may be the same as the Policy Deductible data field.

While any or all the above example additional data fields may be optional, a subset of the additional data fields may be designated as being required to achieve full functionality of a particular look-ahead feature. In an embodiment, various different subsets of additional fields may be designated as required for respective different look-ahead features or functions.

FIGS. 2A-2L illustrate an example set of interactions between the impact data manager 5 and the user interface 15 to generate and deliver client source data to an impact-on-demand system 10. Each of the FIGS. 2A-2L illustrates a different screen that may be displayed on the user interface 15. In embodiments with the impact data manager system 5, the dynamic data delivery module 12 may be configured to cause the screens of FIGS. 2A-2L (or the information therein) to be presented at the user interface 15. Indications of user inputs may be received at the user interface 15 and may be delivered to the dynamic data delivery module 12 of the impact data manager 5 for processing. While FIGS. 2A-2L are described below in conjunction with the impact data manager system 5 and the impact-on-demand or mapping system 10 of FIG. 1, any or all of FIGS. 2A-2L may be used conjunction with other suitable systems.

Figure 2A:
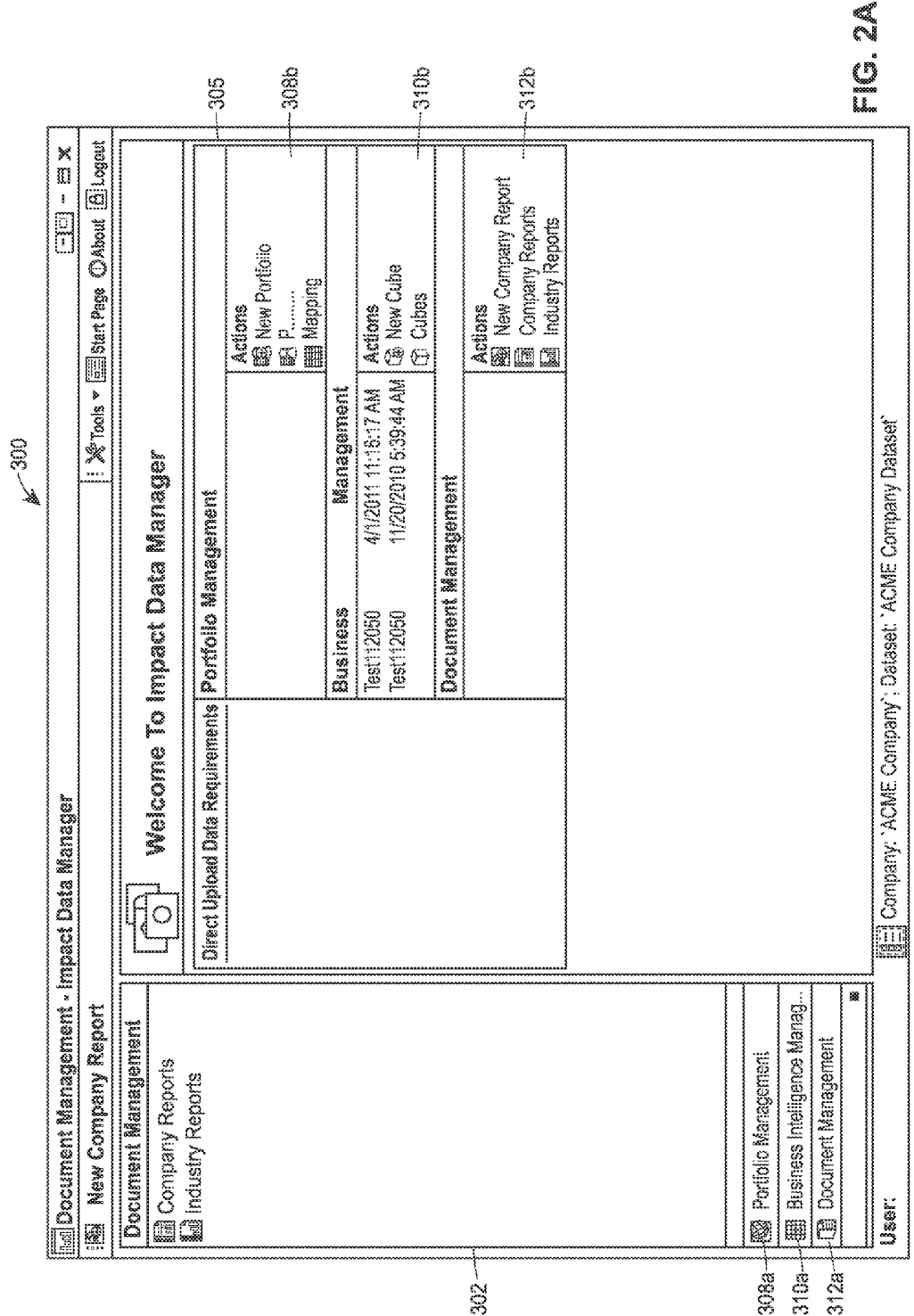

FIG. 2A depicts an example screen shot 300 (e.g., a "home" or "welcome" screen 300) that may be displayed when a user initially accesses the impact data manager system 5 via the user interface 15. In an embodiment, the impact data manager 5 may require permission-based access, e.g., using a login/password combination, biometric identifier, or other secured access mechanism.

In some embodiments, the home screen 300 may be partitioned into multiple areas 302, 305. A first area 302 of the screen 300 may include a display of selectable user controls 308a, 310a, 312a corresponding to high-level management functions that are provided via the impact data manager 5. For example, the impact data manager system 5 may provide a portfolio management function 308a, a business intelligence management function 310a, a document management function 312a, and/or any number of other high-level management functions (not shown). A second area 305 of the screen 300 may include a display of selectable user controls 308b, 310b, 312b for sets of actions that respectively correspond to each of the high-level data management functions 308a, 310a, 312a. Of course, the display of the high-level management functions 308a-312a in the screen portion 302 and corresponding actions 308b-312b in the screen portion 305 is not limited to the arrangement 300 shown in FIG. 2A. Other arrangements of presentation formats are also possible, for example, one or three or any another number of areas may be displayed on the screen 300, the information displayed on the screen 300 may be displayed on a series of screens instead of on a single screen, the high-level management functions 308a-312a and/or the respective sets of actions 308b-312b may be presented in one or more drop-down selection menus or one or more pop-up selection menus or other suitable presentation formats, etc.

In the example scenario, the dynamic data delivery module 12 may receive indications of a user selection of the Portfolio Management function 308a and the action New Portfolio 308b. By this selection combination, the user indicates to the impact data manager 5 that he or she desires to prepare source data for use in a new portfolio to be stored at the mapping system 10.

Figure 2B:
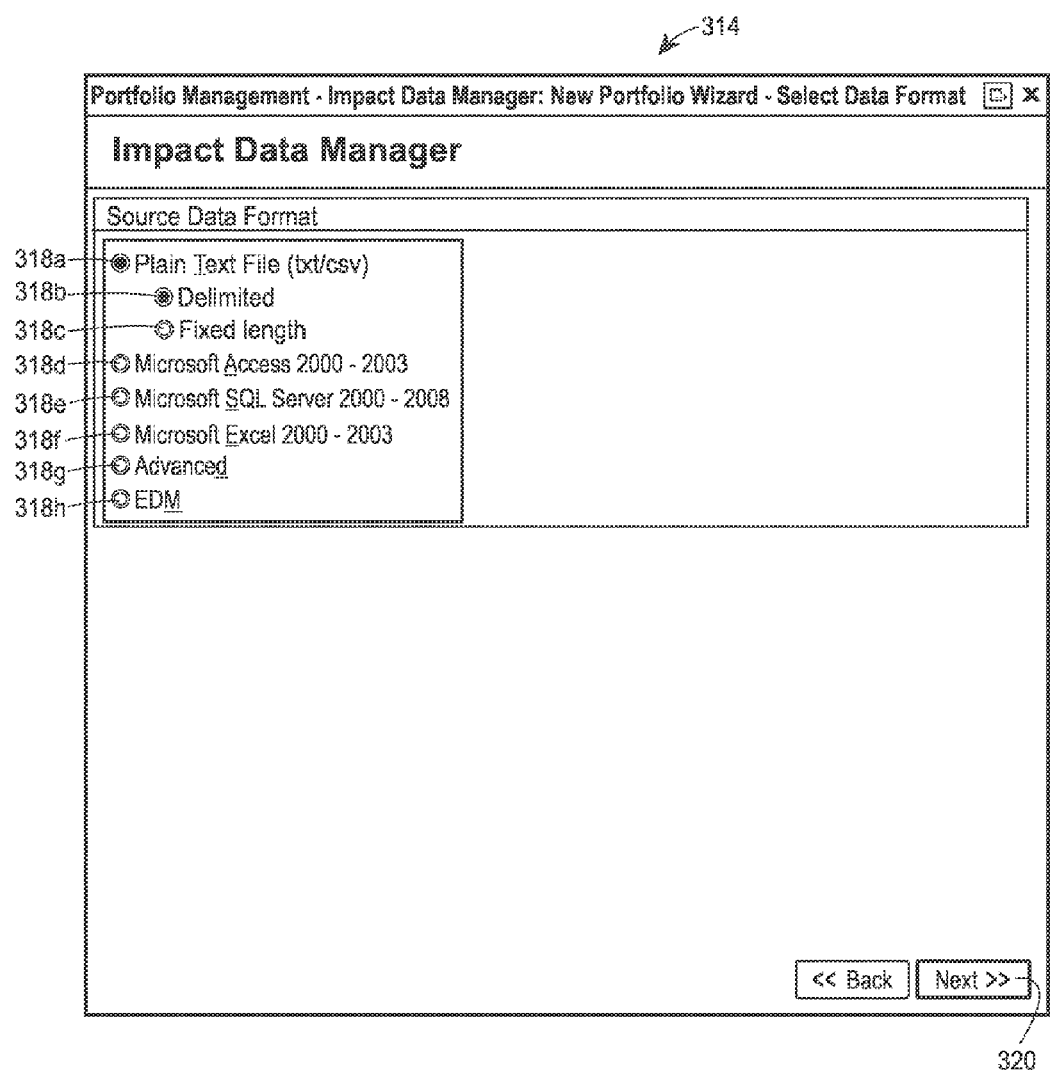

The system 5 may respond to these user selections by displaying a format identification screen 314 as shown in FIG. 2B. The screen 314 may include a display of selectable user controls 318a-318h with each control 318a-318h corresponding to a different source data or database format or type. In an embodiment, the "advanced" user control 318g may correspond to any data format that is supported by the client system 10 when a driver corresponding to the any data format resides on or is accessible to the client system 10. Of course, the complete set of possible data or database formats is not limited to the set 318a-318h shown in FIG. 2B. For example, one or more data formats or types 318a-318h may be omitted from the screen 314, and/or one or more other database formats (not shown) may be included in the screen 314. In an embodiment, a selectable control for a user-defined data format (not shown) may be included on the screen 314, and upon user selection of the control, the user may enter information describing or defining the user-defined data format. In the example scenario illustrated by FIG. 2B, the user has indicated, by selecting the controls 318a and 318b, that the source data to be delivered to the mapping system 10 is in a format corresponding to a delimited plain text file. After selecting the data format, the use may select the "Next" user control 320 or other suitable user control to continue.

Figure 2C:
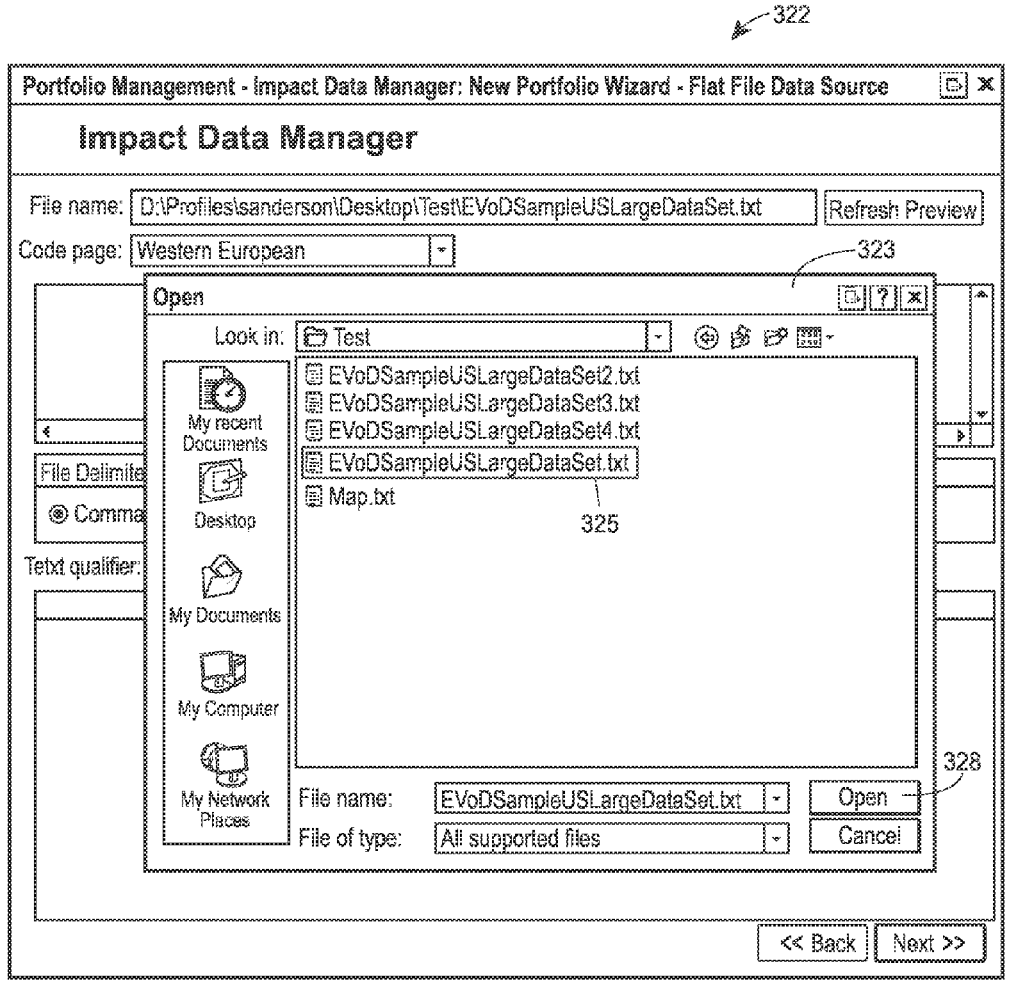

Turning to FIG. 2C, upon receiving the indication of the selected data format, the system 5 may present a window or screen 322 via which the user is able to indicate a desired file of the format type 318a, 318b (as previously selected in window 314 of FIG. 2B) that includes the source data to be delivered to the mapping system 10. The window 322 may allow user to search for the desired data file throughout a file directory structure (e.g., via a pop-up window 323 or other suitable mechanism) and to indicate the desired data file by highlighting 325 a file and selecting the "Open" user control 328 or other suitable user control.

The impact data manager 5 may open or access the source data file, as illustrated by screen 330 of FIG. 2D. In particular, the impact data manager 5 may open the file based on the data format indicated at the format identification screen 314 of FIG. 2B. The name of the file and, in some cases, the path name to the file may be displayed 332 on the screen 330. The impact data manager 5 may attempt to display the file contents of the selected file in a first portion 335 of the screen 330. In the scenario illustrated by FIG. 2D, the display 335 of the file contents is incomplete, garbled, or unexpected, as the impact data manager 5 automatically applied a comma 338a as a default delimiter, while the source data file is delimited by a tab.

Figure 2E:
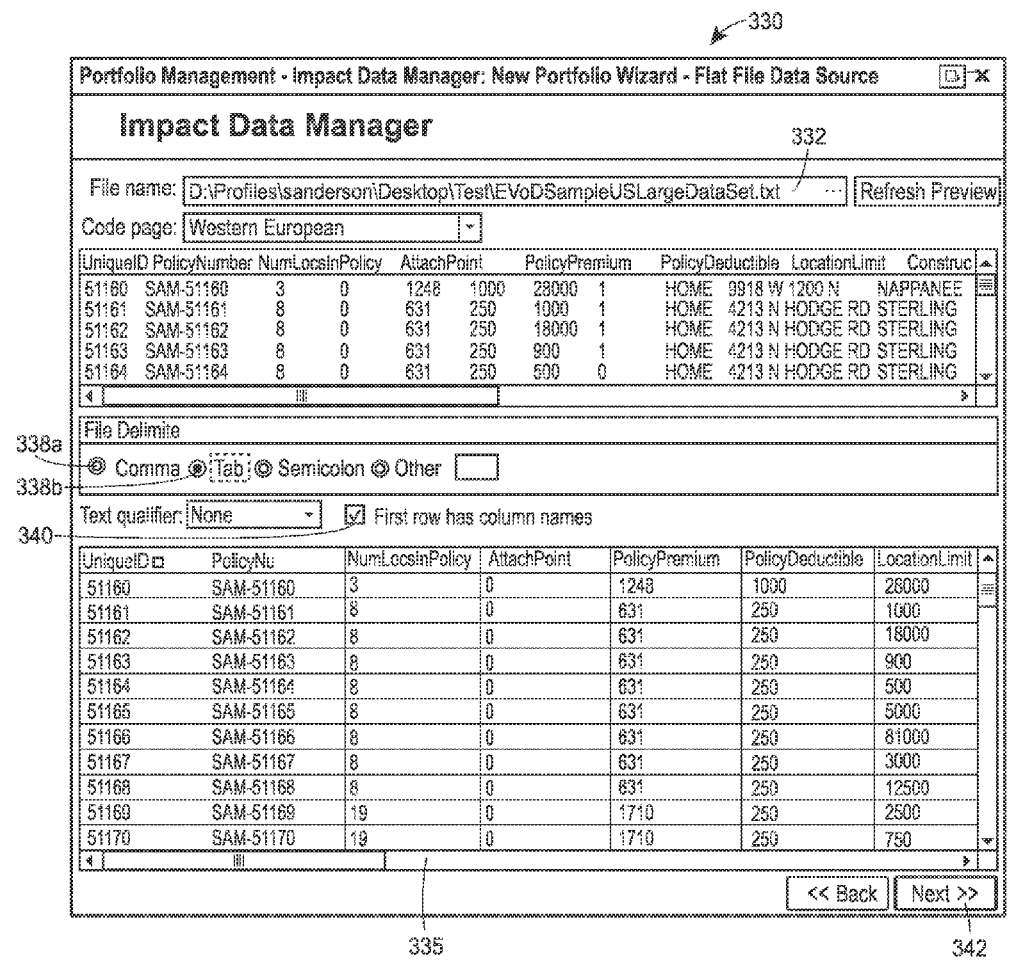

In FIG. 2E, the user has indicated the correct delimiter 338b on the screen 330. Furthermore, the user has indicated that the source data file includes column names or identifiers in its first row (reference 340). Based on these indications 338, 340, the impact data manager 5 may be able to parse the source data file, and may coherently display the contents of the source data file in the first portion 335 of the screen 330. In some embodiments, rather than indicating the delimiter 338b used in the source data file and/or the presence of column headings or data identification 340 at the screen 330 after an attempt to display the file contents has been made, the indications may be received a priori, e.g., the indications may be received concurrently with the data format selection at the format identification screen 314 (FIG. 2B). When the impact data manager 5 has parsed the contents of the source data file and the display 335 of the contents is coherent or otherwise suitable, the user may indicate as such by selecting the "Next" user control 342 or other suitable user control.

Figure 2F:
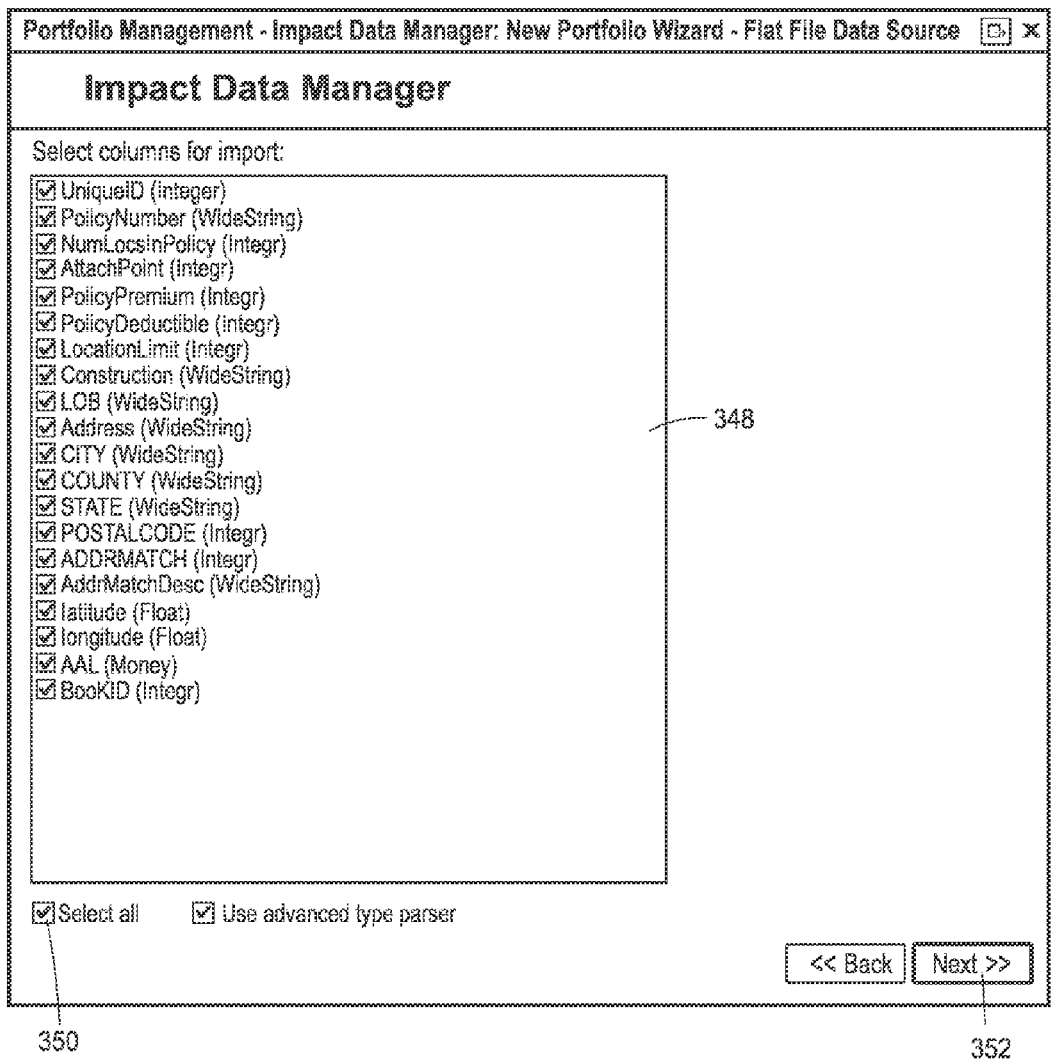

The impact data manager 5 may allow the user to select some or all of the source data contained within the source data file 332 for transformation and upload or delivery to the mapping system 10 to be stored as a portfolio, as shown by the data selection screen 345 of FIG. 2F. In the data selection screen 345, the impact data manager 5 has automatically identified a complete set of data fields 348 included in the source data file 332 from the column headers of the source file 332 (e.g., UniqueID, PolicyNumber, NumLocsInPolicy, etc.), and has automatically presented the set 348 on the screen 345. Via the user control 350, the user may select all of the data fields 348 for inclusion, or the user may select a subset of the data fields by checking and un-checking (or otherwise selecting and unselecting) individual data fields, as desired. In the example scenario of FIG. 2F, the user has selected all of the data fields for inclusion. When the user is satisfied with his or her data field selection, the user may indicate as such by selecting the "Next" user control 352 or other suitable user control.

Figure 2G:
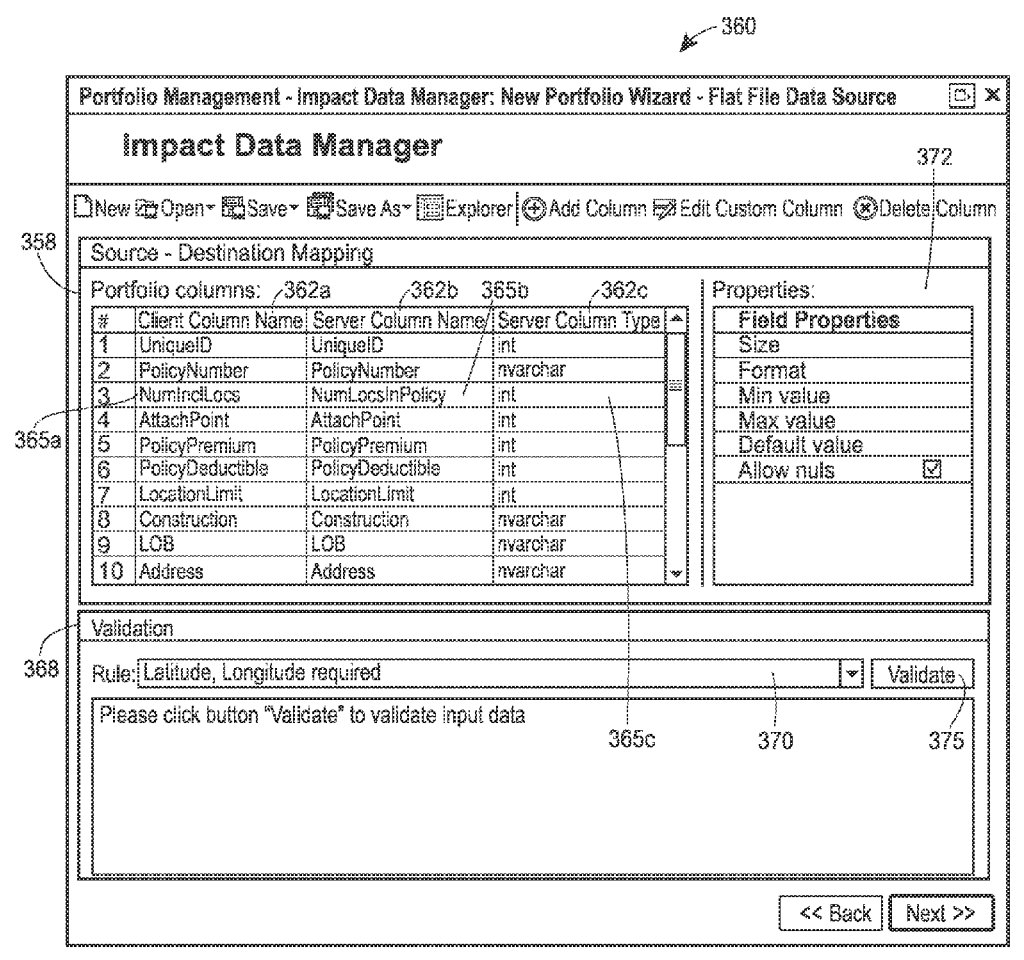

The impact data manager 5 may automatically convert, transform or map the source data from its original or first format to a portfolio, target or second format that is compatible with the mapping system 10. To this end, the impact data manager 5 may display a validation screen 360 as illustrated in FIG. 2G. In an embodiment, the screen 360 may include a first portion 358 that indicates the data fields selected by the client for inclusion in the portfolio. In an embodiment, the first portion 358 may include, for each selected data field, a column heading or identification of data field indicating the original format as used in the source data file 362a, a corresponding column heading of data field indicating the converted format to be used in the portfolio 362b, and an indication of the data type of the portfolio data field 362c (e.g., int, nvarchar, etc.). For example, for the selected data field corresponding to the number of locations in a policy, the source data field is identified by "NumIncl-Locs" (reference 365a), the corresponding portfolio data field is identified by "NumLocsInPolicy" (reference 365b), and the data type of the data in the "NumLocsInPolicy" portfolio data field is "int" (reference 365c).

The screen 360 may include a second portion 368 via which a user may interface with the impact data manager 5 to validate the source data (in its original format, target format, or both). The validation may be performed based on a set of rules such as the set of mapping rules 28a of FIG. 1. The rules 28a may indicate a set of characteristics, limits and/or boundary conditions of the target format, so that source data in the target format (e.g., the converted source data) will be understood by or will be compatible with the mapping system 10. In an embodiment, the set of rules 28a is obtained from the mapping system 10, e.g., via a download or some other suitable data transfer mechanism of at least a portion of a master set of rules 28b, and the local copy of rules 28a may be at least partially updated automatically or per user request.

The user may select one or more rules 28a via, for example, a drop-down menu 370 or other suitable user control selection mechanism. In the example shown in FIG. 2G, the user has selected a rule "latitude/longitude required," which indicates that the converted source data must include latitude/longitude pairs to identify geographical locations. In an embodiment, more than one rule may be selected by the user. In an embodiment, a default set of rules may be automatically selected by the impact data manager 5 and may be indicated in the second portion of the screen 368.

In an embodiment, data field properties may be validated. For example, as shown in FIG. 2G, a third portion 372 of the screen 360 may indicate properties, boundaries or other constraints to be applied to each of the data field names. Properties corresponding to a particular data field may be displayed in the third portion 372 when the particular data field is selected in the first portion 358 of the screen 360. For example, when the user selects the data field "PolicyPremium," a set of properties including a maximum and minimum currency amount for the policy premium may be displayed in the third portion 372 of the screen 360. In some embodiments, a default set of properties 372 may be automatically selected by the impact data manager 5 for at least one of the data fields 358, and the user may change one or more default property values during the validation process.

When the user is satisfied that he or she has selected the desired rules 28a in the second portion 368 of the screen 360 and has indicated the desired properties 372 for desired data fields 358, the user may indicate as such by selecting the "Validate" user control 375 or other suitable user control. Upon receiving the selection of the "Validate" control 375, the impact data manager 5 may automatically validate the data fields 358 and the contents therein based on the rules indicated in the second portion 368 and in the third portion 372 of the screen 360. For example, based on the rules 368, 372, the impact data manager 5 may validate the data fields and/or the contents of the data fields in the first format, the data fields and/or the contents of the data fields in the second format, or both.

In an embodiment, the impact data manager 5 may automatically correct any anomalies or errors found during the validation process and may indicate such automatic corrections to the user. Additionally or alternatively, the impact data manager 5 may find one or more anomalies, may determine one or more possible corrections or adjustments to resolve the one or more anomalies, and may request user input prior to proceeding with applying the possible corrections or any other corrections that are subsequently indicated by the user.

Figure 2H:
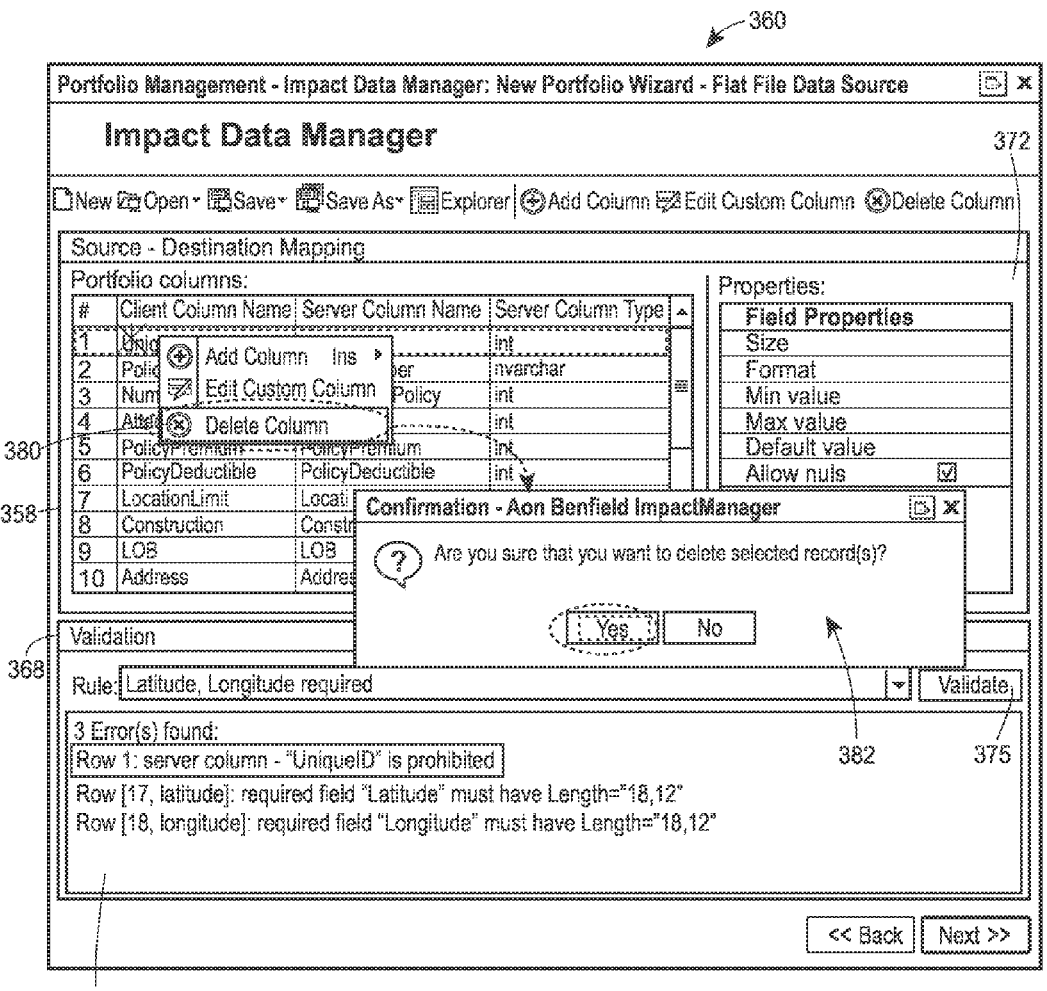

For example, FIG. 2H illustrates the screen 360 after the user has requested validation via the user control 375. A list of detected anomalies or errors 378 has been displayed in the second portion 368 of the screen 360. In the embodiment of FIG. 2H, the user has selected the first error "Row 1: server column—"UniqueID is prohibited" that indicates a presence of a keyed field in the source data. The user has indicated via pop-up windows 380 and 382 that the field UniqueID is to be deleted. In other embodiments, rather than merely bringing the keyed field to the user's attention, the impact data manager 5 may automatically suggest the deletion of Row 1 based on the presence of the keyed field (e.g., via a pop-up window or other suitable user indication). Upon receiving approval from the user for the deletion of Row 1, the impact data manager 5 may proceed accordingly, thus correcting the first error in the data that is to be delivered to the mapping system 10.

Continuing on with anomaly correction, FIG. 2I illustrates the latitude/longitude data field errors in the list 378 being corrected. In the scenario shown in FIG. 2I, the user has selected the error "Row [18, longitude]: required field "Longitude" must have Length='18, 12'" in the list 378 that indicates the lengths of the data field "Longitude" must be of length 18. To correct the error, the user has selected the "Longitude" row in the first portion 358 of the screen 360 to bring up the corresponding properties in the third portion 372 of the screen 360. The user has selected the "Size" property corresponding to the Longitude row to change the values of the "Size" property from "15, 12" to "18, 12." In other embodiments, rather than the user selecting various fields to effect the appropriate corrective action, the impact data manager 5 may automatically suggest the appropriate correction, e.g., via a pop-up window or other suitable user notification. Upon receiving approval from the user for the correction, the impact data manager 5 may proceed accordingly, thus correcting the errors in the data that is to be delivered to the mapping system 10.

FIG. 2J illustrates an embodiment of a validation of a data type. In this example, the user is validating, via the first portion 358 of the screen 360, the data type or units of the PolicyPremium data field that is to be sent to the mapping system 10. The user has invoked a drop-down menu 390 and is changing the data type of the Policy Premium data field from "int" to "money." In other embodiments, rather than the user determining an appropriate data type change, the impact data manager 5 may automatically suggest that one or more data types 362*c* be changed, e.g., via a pop-up window or other suitable user notification. Upon receiving approval from the user for the changing of the one or more data types, the impact data manager 5 may proceed accordingly, thus validating the data types included in the converted source data that is to be delivered to the mapping system 10.

Figure 2K:
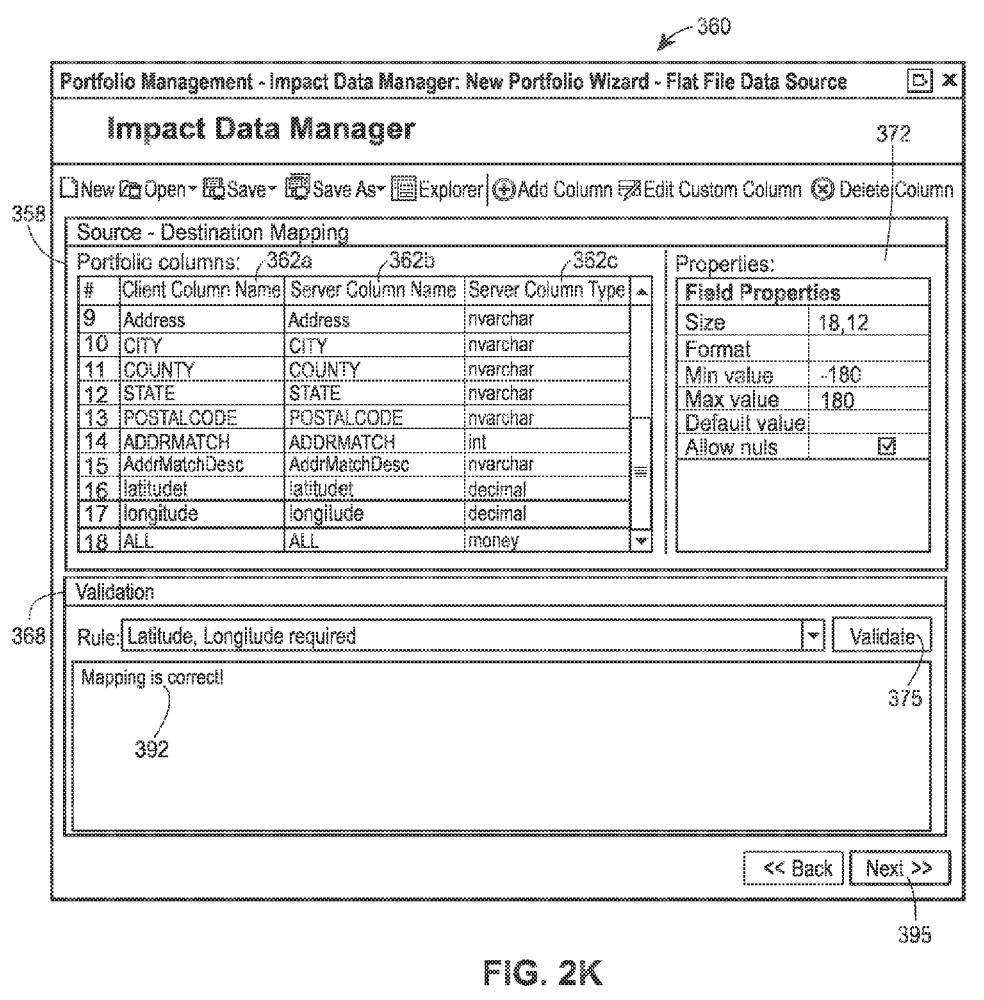

The user may continue with manually correcting errors or anomalies detected during the validation process, and/or accepting corrections or adjustments suggested by the impact data manager 5. For example, the user may activate the "Validate" user control 375 to determine if any anomalies are outstanding, and the user make take steps to correct or resolve any outstanding errors or anomalies. After all anomalies have been corrected or resolved, the impact data manager 5 may indicate as such 392 on the screen 360, as shown in FIG. 2K. The converted, validated source data may now be in a format that is compatible with the mapping system 10. The user may activate the "Next" user control 395 to provide identification of the portfolio to be stored at the mapping system 10.

Figure 2L:
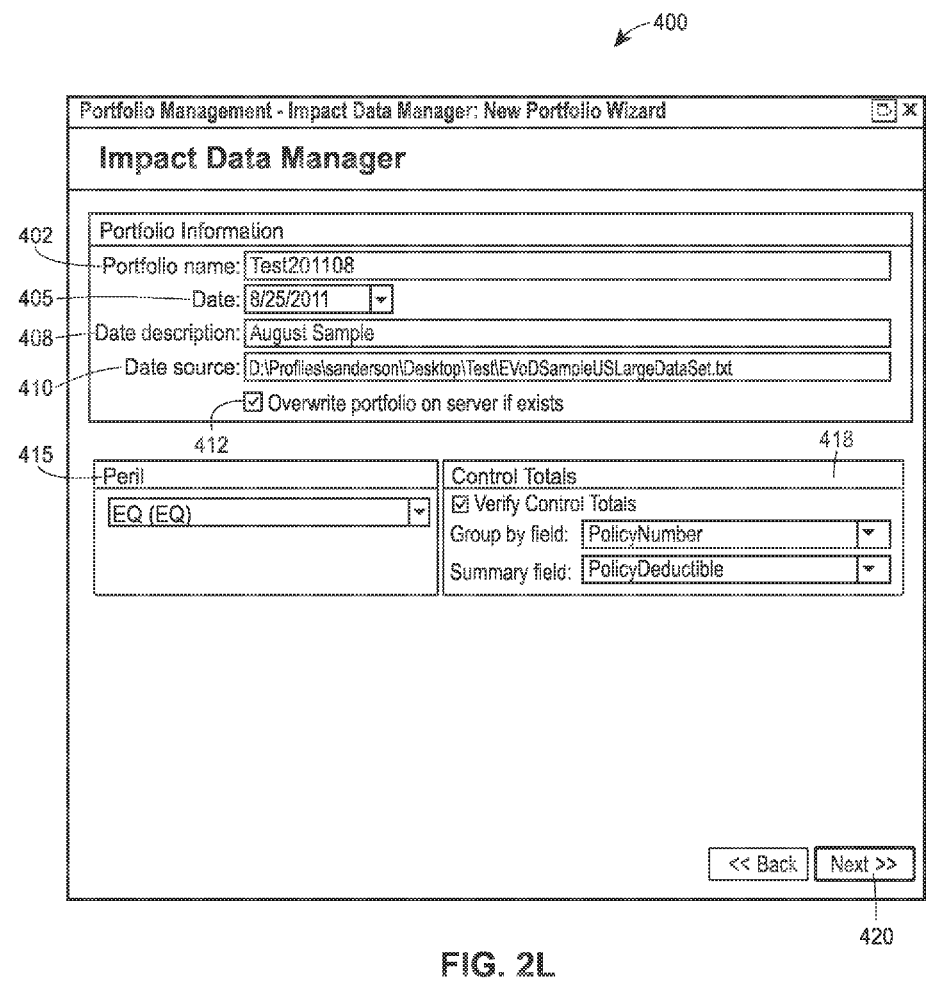

FIG. 2L depicts a screen 400 via which the user may provide identification of the portfolio that is to contain the converted, validated source data and that is to be stored at the mapping system 10. The user may indicate, for example, a portfolio identification or name 402, a date of creation or modification 405, a description 408, an indication of the original source data file 410, and an indication of whether or not to overwrite an existing portfolio at the mapping system 10. The user may indicate a type of peril 415 corresponding to the portfolio, such as via a drop-down menu or other user interface.

Via the screen 400 or via a previous screen (e.g., the validation screen 360), the user may request to validate control totals 418. Control totals may include a verification of a summation or other combination of values, e.g., a maximum exposure for a portfolio, a maximum policy premium when a portfolio includes multiple locations, a maximum number of people, and the like. In an embodiment, one or more control totals may be presented on the user interface 15 for user assessment, and the user may take actions to modify the source data (either original, converted or both) if the user deems necessary. In an embodiment, the impact data manager 5 may automatically determine one or more possible anomalies associated with one or more control totals (e.g., based on the rules 28*a* and/or the properties 372 of the control totals), determine one or more possible corrections or adjustments to resolve the one or more anomalies, and request user input prior to proceeding with applying the possible corrections or other corrections indicated by the user. In some embodiments, control total validation 418 may be performed at the client system 5. In some embodiments, control total validation 418 may be performed at the mapping system 10. For example, the client system 5 may deliver the source data to the mapping system 10 for control total validation, the mapping system 10 may perform control total validation 418 and return control totals to the client system 5 for a user to accept or decline.

After the portfolio has been identified and any desired control totals are validated, the user may activate the "Next" user control 420 to schedule delivery of the converted, validated source data to be stored at the mapping system 10 under the named portfolio.

The user may indicate that the named portfolio (including the converted, validated source data) be immediately delivered to the mapping system 10, e.g., for publication, or the user may schedule the named portfolio to be delivered to the mapping system 10. In an embodiment, prior to delivery, the named portfolio may be encrypted and/or the named portfolio may be compressed. The named portfolio may be delivered to the mapping system 10, and, in real-time, the mapping system 10 may respond to the impact data manager 5 with an acknowledgement of a successful delivery and storage. The impact data manager 5 may provide an indication of the successful delivery at the user interface 15.

As the example scenarios of FIGS. 2A-2L illustrate, the impact data manager 5 may be configured to operate on one or more sets of potentially disparate source data formats, map the one or more sets into a format that is compatible with the back-end mapping system 10, and deliver the compatible source data to the mapping system 10 to be stored as a portfolio. For example, the impact data manager 5 may be configured to perform one or more types of client or front-end validation on the original source data, on the converted source data, or on both the original and the converted source data. The validation may include numerical validation, content validation within or across data fields (e.g., geographic location validation), data field format validation, control total validation, and/or other types of validation. Further, the impact data manager 5 may provide anomaly or error detection and/or anomaly or error correction that may range from manual to fully automatic. As such, with the impact data manager 5 at the front-end, the mapping system 10 at the back-end may be inoculated from being infected by any anomalies in the source data, and may be able to perform mapping functions and respond to client requests more efficiently.

Figure 3:
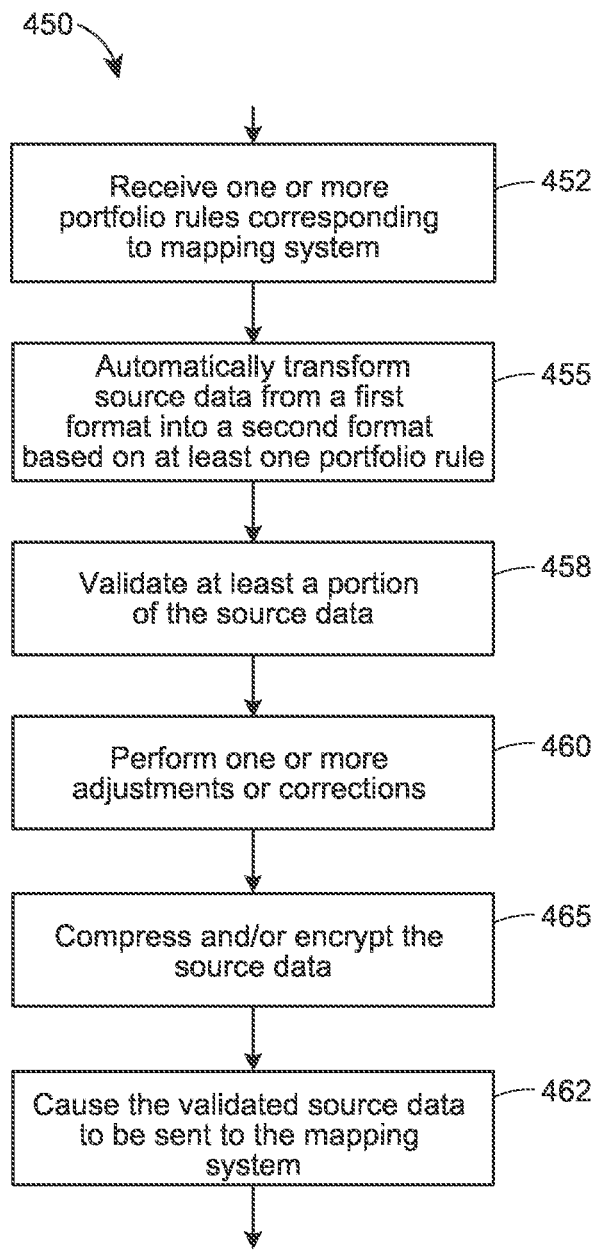
FIG. 3 is an example method for delivering source data to a mapping or impact-on-demand system.

FIG. 3 is an example method 450 for delivering source data to a mapping or impact-on-demand system. Although the method 450 is described in conjunction with the impact data manager system 5 and the mapping system 10 of FIG. 1, the method 450 may operate in conjunction with other suitable systems. Some or all portions of the method 450 may operate in conjunction with by any or all of the screens discussed with respect to FIGS. 2A-2L.

The method 450 may include receiving one or more portfolio rules corresponding to a mapping system 452. For example, an impact data manager 5 or a dynamic data delivery module 12 included in the impact data manager 5 may receive one or more portfolio rules, mapping rules or mapping system rules 28a via a communications link 18a, 18b from a mapping system 10. The one or more portfolio rules 28a may indicate a data format that is understood by and compatible with the mapping system 10, e.g., a set of characteristics, limits, and/or boundary conditions of various data fields and contents of the various data fields. As such, the one or more portfolio rules may define data compatibility with the mapping system 10.

At a block 455, source data to be delivered to the mapping or impact-on-demand system 10 may be automatically transformed or converted from a first or original format into a second or target format. Source data may include data that is provided to the mapping or impact-on-demand system 10 for generating output. Mapping system output may include, for example, maps, reports, risk management assessments, and the like. Source data may include one or more indications of a geographical location. In an embodiment, at least some of the source data may correspond to one or more properties, e.g., to one or more insured real properties or other types of properties. The second format may be at least partially defined or bounded by at least one of the one or more portfolio rules. In an embodiment, the transformation may be at least partially based on user input, such as when a user selects a subset of the source data to be transformed or when the user indicates a priority order of rule application. In an embodiment, the source data may be automatically transformed 455 by the dynamic data delivery module 12 of the impact data manager 5. For example, one or more data field properties such as size, length, format, etc. may be automatically transformed by the dynamic data delivery module 12, a data type of a data field (e.g., num, char, int, money, etc.) may be automatically transformed or changed, or one or more rows or columns of the original source data may be added or deleted.

At a block 458, at least a portion of the source data may be validated. In an embodiment, the dynamic data delivery module 12 may perform a validation of at least a portion of the source data in the first format, at least a portion of the source data in the second format, or both. The validation may be performed based on at least one of the portfolio rules and/or based on at least one other rule. In an embodiment, a user may indicate a rule (in addition to those included in the at least one of the portfolio rules) that is to be used in the validation process. The validation may include, for example, a numerical value validation, a control total validation, a geographical location validation, a cross-check validation between different data cells and/or data fields, a data field property validation, a data field type validation, or any other desired validation. In an embodiment, the types of validation to be performed 458 may be at least partially selected by a user.

At a block 460, if the presence of an anomaly or error is discovered or determined, a correction or adjustment to the source data may be applied or performed. In an embodiment, the dynamic data delivery module 12 may discover an anomaly or error based on at least one of the portfolio rules and/or based on at least one other rule, and the dynamic data delivery module 12 may automatically make a correction or apply an adjustment 460 to the source data based on the anomaly or error. For example, one or more data field properties such as size, length, format, etc. may be automatically adjusted or changed to be compatible with the second format. A data type of a data field (e.g., num, char, int, money, etc.) may be automatically adjusted to be compatible with the second format. One or more rows or columns of the original source data may be added or deleted.

In some embodiments, a correction or adjustment may be performed only after user approval for the correction or adjustment is received. A correction or adjustment may be made to the source data in the first format, to the source data in the second format, or to both. In an embodiment, multiple corrections or adjustments may be made, either simultaneously or sequentially.

In some embodiments, the blocks 458-460 may be iteratively executed until no more anomalies or errors are detected. In some embodiments, the block 455 may be executed in conjunction with at least one iterative execution of the blocks 458-460, such as when additional source data in the first format is required to be added in order to correct a detected anomaly.

At a block 462, the validated, transformed source data may be caused to be delivered to the mapping system 10. In an embodiment, the dynamic data delivery module 12 may cause the validated, transformed source data to be delivered from the impact data manager system 5 to the mapping system 10 via the links 18a, 18b to be stored at the mapping system 10 as a portfolio. In some embodiments, the validated, transformed source data may be encrypted, compressed, or both encrypted and compressed 465 prior to being caused to be delivered 462 to the mapping system 10.

Figure 4A:
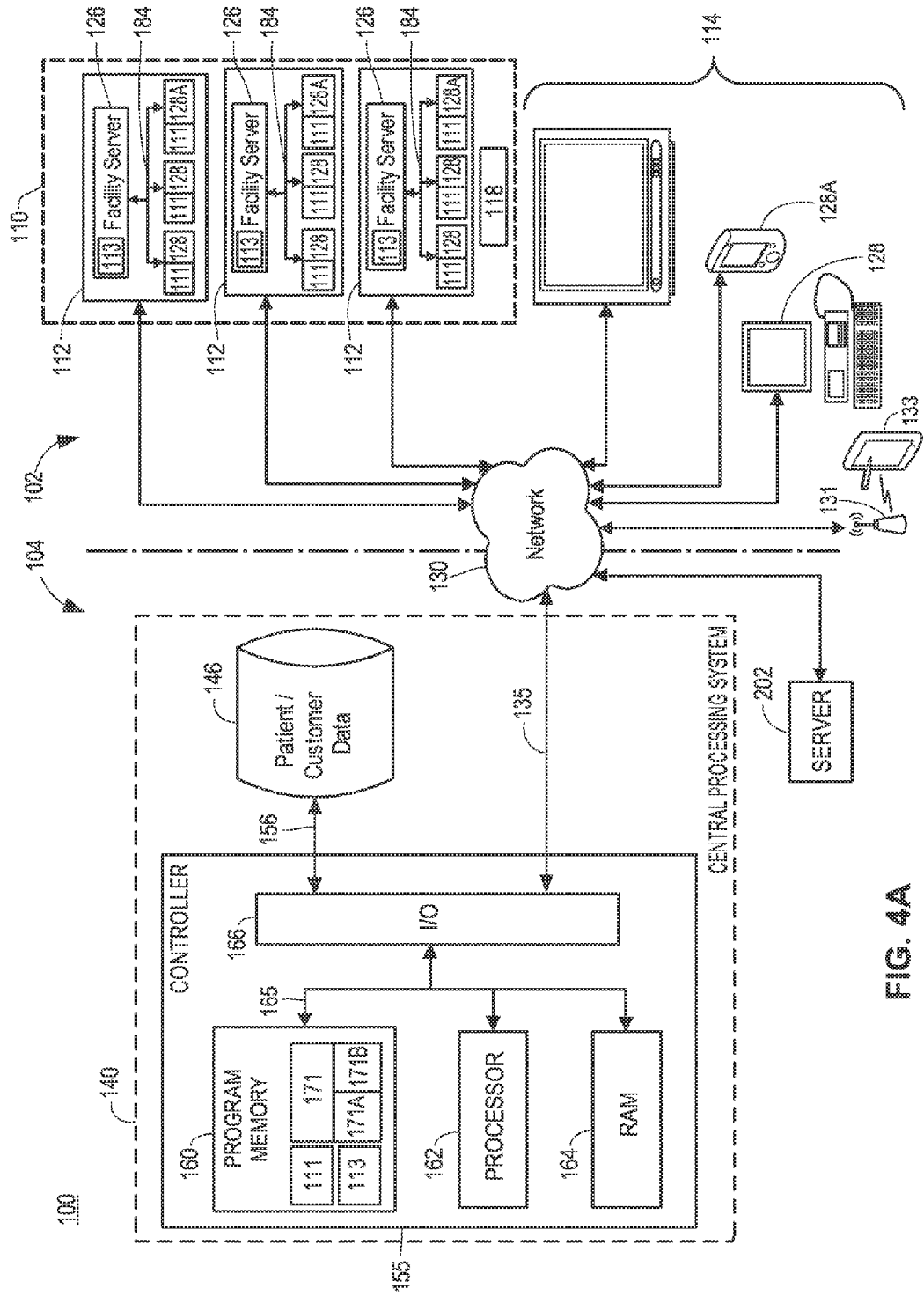
FIGS. 4A-4D each illustrates various aspects of an exemplary architecture implementing an impact data manager and/or an impact-on-demand or mapping system including source data delivery.
Figure 4B:
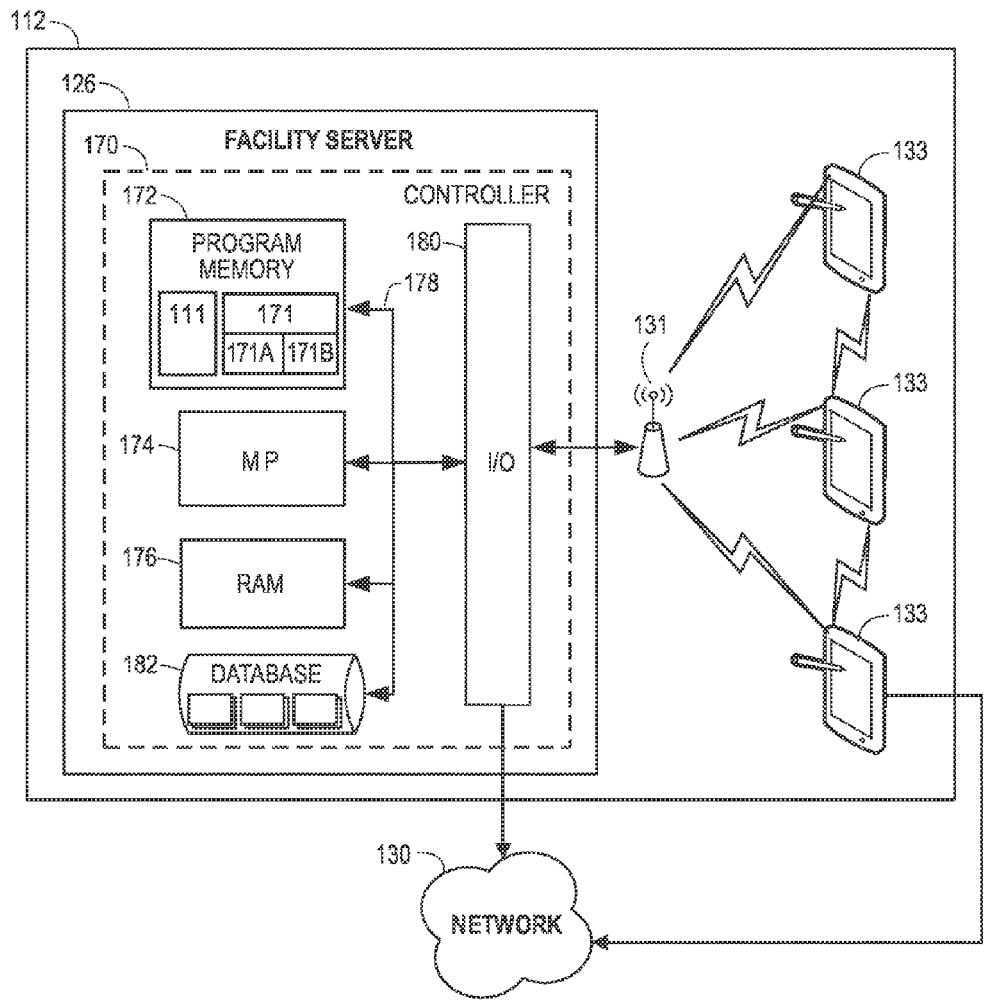

FIGS. 4A and 4B illustrate various aspects of an exemplary architecture for an impact-on-demand platform 100 that may support one or more systems, methods, user interfaces and other techniques described herein. For example, the impact-on-demand platform 100 may include the impact data manager 5 and the impact-on-demand or mapping system 10 of FIG. 1, in an embodiment. The impact-on-demand platform 100 may support the method 450 of FIG. 3, in an embodiment.

The impact-on-demand platform 100 may include both hardware and software applications, as well as various data communications channels for communicating data between the various hardware and software components. The impact-on-demand platform 100 may be roughly divided into front-end components 102 and back-end components 104. The front-end components 102 may primarily (but not necessarily) be disposed within a client network 110 including one or more clients computing devices 112. The client devices 112 may be located, by way of example rather than limitation, in separate geographic locations from each other, including different areas of the same city, different cities, or even different states. The front-end components 102 may additionally comprise a number of workstations 128. The workstations 128 may be local computers or computing devices located in the various locations 112 throughout the network 110 and executing various impact-on-demand/impact data manager applications. In an embodiment, each workstation and local computing device 128 may include an instance of an impact data manager, such as the impact data manager 5 discussed with respect to FIG. 1.

Web-enabled devices 114 (e.g., personal computers, tablets, cellular phones, smart phones, web-enabled televisions, etc.) may be communicatively connected to locations 112 and to the system 140 through a digital network 130 or a wireless router 131. In an embodiment, a web-enabled device 114 may include the user interface 15 of FIG. 1. In an embodiment, the digital network 130 may be the network 25 of FIG. 1.

Returning now to FIG. 4A, those of ordinary skill in the art will recognize that the front-end components 102 may also comprise a plurality of facility servers 126 disposed at the plurality of locations 112 instead of, or in addition to, a plurality of workstations 128, in an embodiment. Each of the locations 112 may include one or more facility servers 126 that may facilitate communications between the web-enabled devices 114 and the back-end components 104 via the digital network 130, described below, and between the terminals 128, 128A of the locations 112 via the digital network 129, and may store information for a plurality of customers/employees/accounts/etc. associated with each facility 112. In an embodiment, each server 126 may include an instance of an impact data manager, such as the impact data manager 5 discussed with respect to FIG. 1.

Of course, a local digital network 184 may also operatively connect each of the workstations 128 to the facility server 126. Unless otherwise indicated, any discussion of the workstations 128 also refers to the facility servers 126, and vice versa. Moreover, environments other than the locations 112, such as the kiosks, call centers, and Internet interface terminals may employ the workstations 128, the web-enabled devices 114, and the servers 126. As used herein, the term "location" refers to any of these points of contact (e.g., call centers, kiosks, Internet interface terminals, etc.) in addition to the locations 112, etc. described above.

The front-end components 102 may communicate with the back-end components 104 via the digital network 130. In embodiment, the digital network 130 may be the network 25 of FIG. 1. One or more of the front-end components 102 may be excluded from communication with the back-end components 104 by configuration or by limiting access due to security concerns. For example, the web enabled devices 114 may be excluded from direct access to the back-end components 104. In some embodiments, the locations 112 may communicate with the back-end components via the digital network 130. In other embodiments, the locations 112 and web-enabled devices 114 may communicate with the back-end components 104 via the same digital network 130, but digital access rights, IP masking, and other network configurations may deny access of the web-enabled devices 114. The web-enabled devices may also connect to the network 130 via the encrypted, wireless router 131.

The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. In addition to one or more web servers 202 (described below), the back-end components 104 may include a central processing system 140 within a central processing facility. In an embodiment, the central processing system 140 may include the mapping or impact-on-demand system 10 of FIG. 1. Of course, the locations 112 may be communicatively connected to different back-end components 104 having one or more functions or capabilities that are similar to the central processing system 140 (e.g., a processing system 141, 142, not shown). The central processing system 140 may include one or more computer processors 162 adapted and configured to execute various software applications and components of the mapping or impact-on-demand system 10.

The central processing system 140 may include a database 146. The database 146 may be adapted to store data related to the operation of the impact-on-demand platform 100, such as client portfolios, business intelligence cubes, mapping rules 28b and the like. In an embodiment, the database 146 may be the mapping system data storage entity 20 of FIG. 1. The central processing system 140 may access data stored in the database 146 when executing various functions and tasks associated with the operation of the system 100.

Although the impact-on-demand platform 100 is shown to include a central processing system 140 in communication with three locations 112 and various web-enabled devices 114 it should be understood that different numbers of processing systems, locations, and devices may be utilized. For example, the digital network 130 (or other digital networks, not shown) may interconnect the system 100 to a plurality of included central processing systems 140, hundreds of locations 112, and thousands of web-enabled devices 114. According to the disclosed example, this configuration may provide several advantages, such as, for example, enabling near real-time uploads and downloads of information as well as periodic uploads and downloads of information. This provides for a primary backup of all the information generated in the wireless customer data transfer process. Alternatively, some of the locations 112 may store data locally on the facility server 126 and/or the workstations 128.

FIG. 4A also depicts a possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 may include a non-transitory, tangible program memory 160, the processor 162 (may be called a microcontroller or a microprocessor), a non-transitory, tangible random-access memory (RAM) 164, and the input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

FIG. 4B depicts a possible embodiment of the front-end components 102 located in one or more of the client locations 112 from FIG. 4A. Although the following description addresses the design of the locations 112, it should be understood that the design of one or more of the locations 112 may be different from the design of others of the locations 112. Also, each of the locations 112 may have various different structures and methods of operation. It should also be understood that while the embodiment shown in FIG. 4B illustrates some of the components and data connections that may be present in a location 112, it does not illustrate all of the data connections that may be present in a location 112. For exemplary purposes, one design of a location is described below, but it should be understood that numerous other designs may be utilized.

Each of the locations 112 may have one or more tablets or user computing devices 133 and/or a facility server 126. The digital network 184 and wireless router 131 may operatively connect the facility server 126 to the plurality of user devices 133 and/or to other web-enabled devices 114 and workstations 128. The digital network 184 may be a wide area network (WAN), a local area network (LAN), or any other type of digital network readily known to those persons skilled in the art. The digital network 130 may operatively connect the facility server 126, the health tablets 133, the workstations 128, and/or the other web-enabled devices 114 to the central processing system 140.

Each tablet 133, workstation 128, client device terminal 128A, or facility server 126 may include a controller 170. Similar to the controller 155 from FIG. 4A, the controller 170 may include a non-transitory, tangible program memory 172, a microcontroller or a microprocessor (MP) 174, a non-transitory, tangible random-access memory (RAM) 176, and an input/output (I/O) circuit 180, all of which are interconnected via an address/data bus 178. In some embodiments, the controller 170 may also include, or otherwise be communicatively connected to, a database 182. In an embodiment, the database 182 may be, for example, the data storage entity 30 of FIG. 1.

The database 182 may include data such as customer records, insurer information records, and rules (e.g., the mapping rules 28a described with respect to FIG. 1) and miscellaneous information. As discussed with reference to the controller 155, it should be appreciated that although FIG. 4B depicts only one microprocessor 174, the controller 170 may include multiple microprocessors 174. Similarly, the memory of the controller 170 may include multiple RAMs 176 and multiple program memories 172. Although the FIG. 4B depicts the I/O circuit 180 as a single block, the I/O circuit 180 may include a number of different types of I/O circuits. The controller 170 may implement the RAM(s) 176 and the program memories 172 as semiconductor memories, magnetically readable memories, and/or optically readable memories, for example.

Either or both of the program memories 160 (FIG. 4A) and 172 may also contain machine-readable instructions (i.e., software) 171, for execution within the processors 162 (FIG. 4A) and 174, respectively. The software 171 may perform the various tasks associated with operation of the location or locations, and may be a single module 171 or a plurality of modules 171A, 171B. While the software 171 is depicted in FIGS. 4A and 4B as including two modules, 171A and 171B, the software 171 may include any number of modules accomplishing tasks related to location operation. In an embodiment, the software 171 may include the computer-executable instructions of the dynamic data delivery module 12 of FIG. 1.

In addition to the controller 170, the tablets 133, the workstations 128 and the other web-enabled devices 114 may further include a user interface such as the user interface 15 of FIG. 1. In an embodiment, the user interface may include a display and a keyboard as well as a variety of other input/output devices (not shown) such as a scanner, printer, mouse, touch screen, track pad, track ball, isopoint, voice recognition system, digital camera, bar code scanner, RFID reader, bio-identifier, etc. A location employee may sign on and occupy each tablet 133, workstation 128 or client device terminal 128A to assist the employee in performing his or her duties. Employees may sign onto the tablet 133, workstation 128 or the client device terminal 128A using any available technique, such as entering a user name and password. If an employee signs on to the system using a tablet 133, the network 184 may communicate this information to the facility server 126, so that the controller 170 may identify which employees are signed onto the system 100 and which tablet 133, workstation 128 or client device terminal 128A the employee is signed onto.

Various software applications resident in the front-end components 102 and the back-end components 104 may implement functions related to location and mapping operations, and provide various user interface means to allow users to access the system 100. One or more of the front-end components 102 and/or the back-end components 104 may include a user-interface application 111 for allowing a user to input and view data associated with the system 100, and to interact with the impact-on-demand platform 100. The user-interface application 111 may, for example, be in communicative connection with the dynamic data delivery module 12, or may be a part of the dynamic data delivery module 12. In an embodiment, the user interface application 111 is a web browser client, and the facility server 126 or the central processing system 140 implements a server application 113 for providing data to the user interface application 111. However, the user interface application 111 may be any type of interface, including a proprietary interface, and may communicate with the facility server 126 or the central processing system 140 using any type of protocol including, but not limited to, file transfer protocol (FTP), telnet, 32 hypertext-transfer protocol (HTTP), etc. Moreover, some embodiments may include the user interface application 111 running on one of the web-enabled devices 114 (as when a patient is accessing the system), while other embodiments may include the application 111 running on the tablet 133 in a location 112. The central processing system 140 and/or the facility server 126 may implement any known protocol compatible with the user-interface application 111 running on the tablets 133, the workstations 128 and the web-enabled devices 114 and adapted to the purpose of receiving and providing the necessary information during the wireless data transfer process.

Figure 4C:
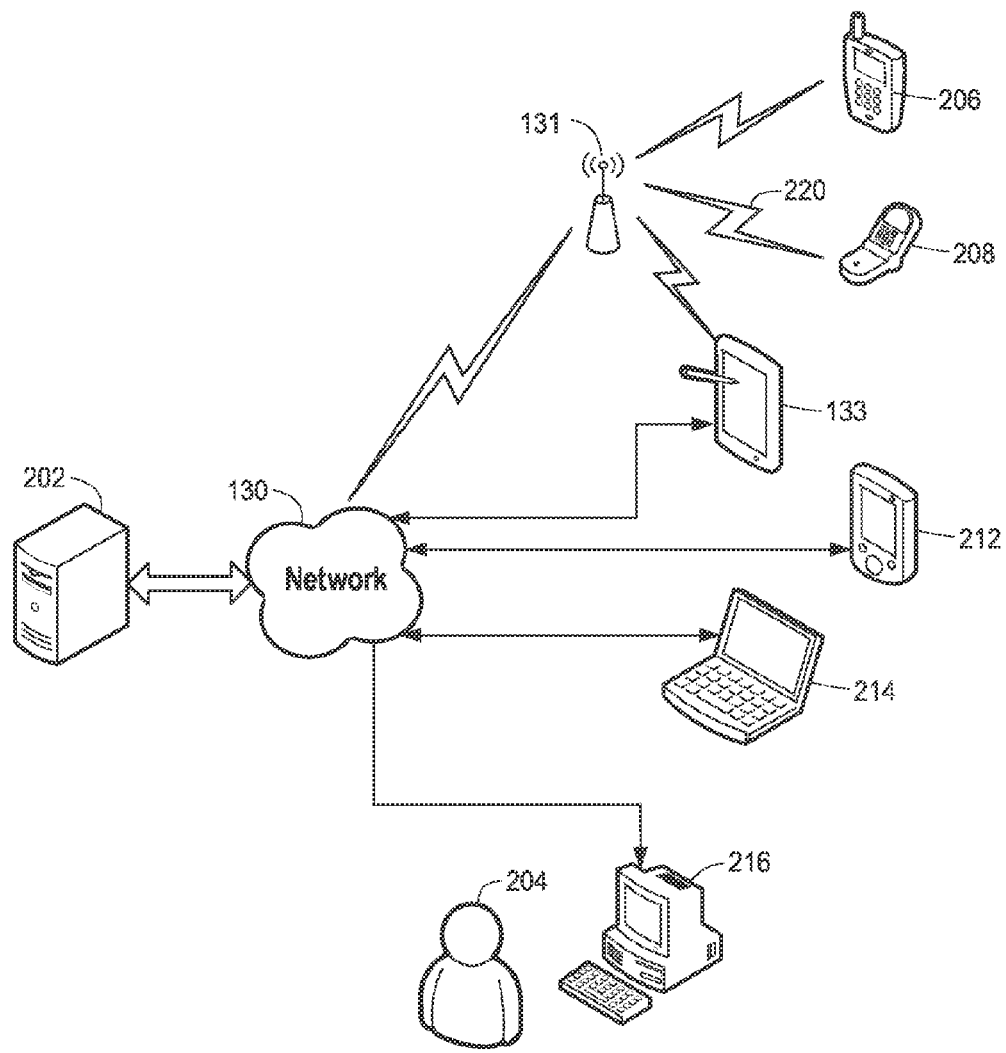

For purposes of implementing the impact-on-demand platform 100, the user may interact with location systems (e.g., the central processing system 140) via a plurality of web pages. FIG. 4C depicts a web server 202 connected via the network 130 to a plurality of tablets 133 and other web-enabled devices through which a user 204 may initiate and interact with the impact-on-demand platform 100. The web enabled devices may include, by way of example, a smart phone or device 206, a web-enabled cell phone 208, a tablet computer 133, a personal digital assistant (PDA) 212, a laptop computer 214, a desktop computer 216, a portable media player (not shown), etc. Of course, any web-enabled device appropriately configured may interact with the impact-on-demand platform 100. The web-enabled devices 133 and 206-216 need not necessarily communicate with the network 130 via a wired connection. In some instances, the web enabled devices 133 and 206-216 may communicate with the network 130 via wireless signals 220 and, in some instances, may communicate with the network 130 via an intervening wireless or wired device 131, which may be a wireless router, a wireless repeater, a base transceiver station of a mobile telephony provider, etc. Each of the web-enabled devices 133 and 206-216 may interact with the web server 202 to receive web pages, such as the web page 222 depicted in FIG. 4C, for display on a display associated with the web-enabled device 133 and 206-216. It will be appreciated that although only one web server 202 is depicted in FIG. 4C, multiple web servers 202 may be provided for the purpose of distributing server load, serving different web pages, implementing different portions of the location web interface, etc.

Figure 4D:
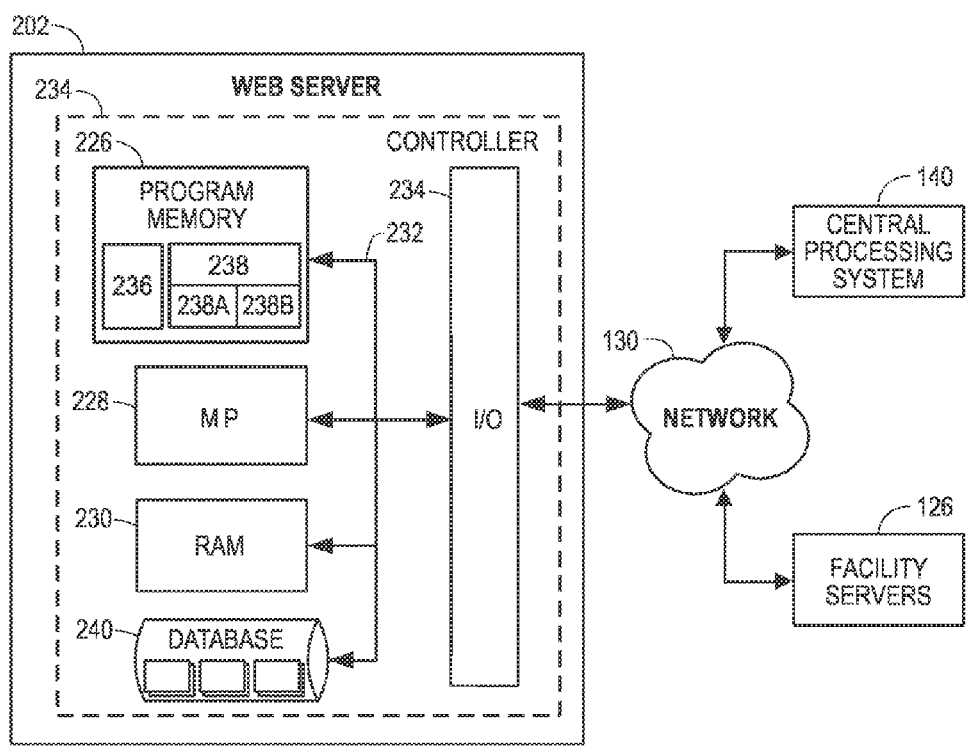

Turning now to FIG. 4D, the web server 202, like the facility server 126, may include a controller 234. Similar to the controllers 155 and 170, the controller 234 may include a non-transitory, tangible program memory 226, a microcontroller or a microprocessor (MP) 228, a non-transitory, tangible random-access 33 memory (RAM) 230, and an input/output (I/O) circuit 234, all of which may be interconnected via an address/data bus 232. In some embodiments, the controller 234 may also include, or otherwise be communicatively connected to, a database 240 or other data storage mechanism (e.g., one or more hard disk drives, optical storage drives, solid state storage devices, etc.). The database 240 may include data such as customer web profiles, product data, web page templates and/or web pages, and other data necessary to interact with the user 204 through the network 130. As discussed with reference to the controllers 155 and it should be appreciated that although FIG. 4D depicts only one microprocessor 228, the controller 224 may include multiple microprocessors 228. Similarly, the memory of the controller 224 may include multiple non-transitory, tangible RAMs 230 and multiple non-transitory, tangible program memories 226. Although the FIG. 4D depicts the I/O circuit 234 as a single block, the I/O circuit 234 may include a number of different types of I/O circuits. The controller 224 may implement the RAM(s) 230 and the program memories 226 as semiconductor memories, magnetically readable memories, and/or optically readable memories, for example.

In addition to being connected through the network 130 to the user devices 133 and 206-216, as depicted in FIG. 4C, FIG. 4D illustrates that the web server 202 may also be connected through the network 130 to the central processing system 140 and/or one or more facility servers 126. As described below, connection to the central processing system 140 and/or to the one or more facility servers 126 facilitates the impact-on-demand platform 100.

The program memory 226 and/or the RAM 230 may store various applications for execution by the microprocessor 228. For example, an application 236 may provide a user interface to the server, which user interface may, for example, allow a network administrator to configure, troubleshoot, or test various aspects of the server's operation, or otherwise to access information thereon. A server application 238 may operate to populate and transmit web pages to the web-enabled devices 206-216, receive information from the user 204 transmitted back to the server 202, and forward appropriate data to the central processing system 140 and the facility servers 126, as described below. Like the software the server application 238 may be a single module 238 or a plurality of modules 238A, 238B. In an embodiment, the module 238 or the modules 238A, 238B may include at least a portion of the computer-executable instructions for the dynamic data delivery module 12 of FIG. 1.

While the server application 238 is depicted in FIG. 4D as including two modules, 238A and 238B, the server application 238 may include any number of modules accomplishing tasks related to implantation of the web server 202. By way of example, the module 238A may populate and transmit the web pages and/or may receive and evaluate inputs from the user 204 to facilitate in the wireless transfer of data from a first tablet to a second tablet, while the module 238B may communicate with one or more of the back end components 104 to provide the requested data.

Typically, a user may launch or instantiate a user interface application (e.g., a web browser or other client application) from a web-enabled device, such as the web-enabled devices 133 and 206-216, to access the web server 202 cooperating with the system 140 to implement the impact-on-demand platform 100.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A system for delivering source data to a mapping system, comprising:
   a dynamic data delivery module comprising instructions stored on a non-transitory computer readable medium;
   a link that communicatively connects said dynamic data delivery module and said mapping system, said mapping system configured to receive data from said dynamic data delivery module and to geographically map contents of the received data and impact events to determine risk exposure; and
   a data storage entity configured to store, upon one or more non-transitory computer readable media, a set of transformation rules and a set of validation rules, wherein said sets of rules are different,
   wherein the instructions of said dynamic data delivery module, when executed by a processor, cause the processor to:
      receive, from a user via a graphical user interface, user input defining a first data format, and a plurality of properties corresponding to a plurality of data fields of the first format,
      store, via the data storage entity, the properties as at least a portion of the set of validation rules,
      import said source data into a database structure, wherein importing comprises transforming the source data from the first format to a second format of the database structure using at least one of said set of transformation rules,
      automatically apply at least one of said set of validation rules to identify one or more anomalies within the source data, each anomaly of the one or more anomalies corresponding to a data incompatibility with the second format,
      for each anomaly of the one or more anomalies, identify, for user review at said graphical user interface, a source data location and a characteristic of the respective anomaly,
      for each anomaly of the one or more anomalies,
         upon selection, by the user via the graphical user interface, of the respective anomaly, present, to the user via the graphical user interface, at least one recommended corrective action for repairing the respective anomaly,
         provide to the user, through the graphical user interface, a selection control for providing, upon activation, an indication of a selected corrective action of the at least one recommended corrective action, and responsive to receiving the indication of the selected corrective action, adjust the respective source data location of the source data in accordance with the selected corrective action, and after adjusting the source data to correct all of the one or more anomalies, cause said validated source data to be delivered, via said link, to said mapping system to be stored in a client portfolio.

2. The system of claim 1, wherein the instructions, when executed by the processor, cause the processor to:

obtain said set of transformation rules and said set of validation rules; and store said sets of rules in said data storage entity.

3. The system of claim 1, wherein the application of the at least one of said set of validation rules further comprises at least one of: a numerical value validation, a control total validation or a geographical location validation.

4. The system of claim 3, wherein said geographical location validation is based on at least one of: an indication of a latitude/longitude pair included in said source data, or an indication of at least a portion of a mailing address included in said source data.

5. The system of claim 1, wherein said processor is included in a first computing device and wherein said mapping system is resident on one or more other computing devices.

6. The system of claim 1, wherein said link includes an Internet connection.

7. The system of claim 1, wherein the instructions, when executed by the processor, cause the processor to encrypt said validated source data prior to causing said validated source data to be delivered to said mapping system.

8. The system of claim 1, wherein the instructions, when executed by the processor, cause the processor to compress said validated source data prior to causing said validated source data to be delivered to said mapping system.

9. The system of claim 1, wherein said source data corresponds to a set of insured properties.

10. A method of delivering source data to a mapping system, comprising:

receiving, from a user via a graphical user interface, user input defining a first data format, and a plurality of properties corresponding to a plurality of data fields of the first format;

receiving, at a computing device via a communications link from said mapping system, one or more portfolio rules and one or more validation rules;

importing, by processing circuitry of the computing device, said source data into a database structure, wherein importing comprises transforming the source data from the first format to a second format of the database structure using at least one of said one or more portfolio rules;

automatically applying, by the processing circuitry, at least one of said one or more validation rules to identify one or more anomalies within the source data, each anomaly of the one or more anomalies corresponding to a data incompatibility with the second format;

for each anomaly of the one or more anomalies, identifying, by the processing circuitry for user review at the graphical user interface, a source data location and a characteristic of the respective anomaly;

for each anomaly of the one or more anomalies, upon selection, by the user via the graphical user interface, of the respective anomaly, presenting, to the user via the graphical user interface, at least one recommended corrective action for repairing the each identified anomaly, providing to the user, through the graphical user interface, a selection control for a selection control for providing, upon activation, an indication of a selected corrective action of the at least one recommended corrective action, and responsive to receiving the indication of the selected corrective action, adjusting, by the processing circuitry, the source data in accordance with the selected corrective action; and after adjusting the source data to correct all of the one or more anomalies, causing said validated source data to be delivered, via said communications link from said computing device to said mapping system for mapping with one or more impact events for risk exposure analysis.

11. The method of claim 10, wherein applying the at least one of said one or more validation rules further comprises at least one of performing a numerical value validation, performing a control total validation, performing a property validation, or performing a geographical location validation.

12. The method of claim 11, wherein performing said geographical location validation is based on at least one of: an indication of a latitude/longitude pair included in said source data, or an indication of at least a portion of a mailing address included in said source data.

13. The method of claim 10, further comprising receiving a second user input at said computing device, and wherein importing said source data is based on said second user input.

14. The method of claim 10, wherein causing said validated source data to be delivered via said communications link comprises causing said validated source data to be delivered via the public Internet.

15. The method of claim 10, further comprising at least one of encrypting, by the processing circuitry, said validated source data, and compressing, by the processing circuitry, said validated source data.

16. The method of claim 10, wherein causing said validated source data to be delivered to said mapping system comprises causing said validated source data, including an indication of at least one insured property, to be delivered to said mapping system.

17. A system for delivering source data to a mapping system, comprising:

a dynamic data delivery module stored on a non-transitory computer storage medium, said dynamic data delivery module including:

a first communicative connection to a user interface, and a second communicative connection to said mapping system, said mapping system being configured to receive data from said dynamic data delivery module and to geographically map contents of said data and impact events to determine risk exposure; and a processor;

wherein instructions of said dynamic data delivery module, when executed by said processor, cause the processor to:

receive, from a user via the user interface, user input defining a first data format, and a plurality of properties corresponding to a plurality of data fields of the first format, store, via the data storage entity, the properties as at least a portion of one or more validation rules, import said source data into a database structure, wherein importing comprises transforming the source data from the first format to a second format of the database structure using at least transform one or more portfolio rules, automatically apply at least one of the one or more validation rules to identify one or more anomalies within the source data, each anomaly of the one or more anomalies corresponding to a data incompatibility with the second format, for each anomaly of the one or more anomalies, identify, for user review at the user interface, a source data location and a characteristic of the respective anomaly, for each anomaly of the one or more anomalies,
- upon selection, by the user via the user interface, of the respective anomaly, present, to the user via the user interface, at least one recommended corrective action for repairing the respective anomaly,
- provide to the user, through the user interface, a selection control for providing, upon activation, an indication of a selected corrective action of the at least one recommended corrective action, and
- responsive to receiving the indication of the selected corrective action, adjust the respective source data location of the source data in accordance with the selected corrective action, and after adjusting the source data to correct all of the one or more anomalies, cause said validated source data to be delivered, via said second communicative connection, to said mapping system to be stored in a client portfolio.

18. The system of claim 17, wherein said instructions, when executed by the processor, cause the processor to receive, via said second communicative connection, said portfolio and validation rules.

19. The system of claim 17, wherein said application of the at least one of the one or more validation rules further comprises at least one of: a numerical value validation, a control total validation, a geographical location validation.

20. The system of claim 19, wherein said geographical location validation is based on at least one of: an indication of a latitude/longitude pair included in said source data, or an indication of at least a portion of a mailing address included in said source data.

21. The system of claim 17, wherein said non-transitory computer storage medium is included in a first computing device, said user interface is communicatively connected to said first computing device, and said mapping system is resident on one or more other computing devices.

22. The system of claim 17, wherein at least one of said first communicative connection or said second communicative connection includes an Internet connection.

23. The system of claim 17, wherein said instructions, when executed by the processor, cause the processor to perform at least one of: encryption of said validated source data prior to causing said validated source data to be delivered to said mapping system, and compression of said validated source data prior to causing said validated source data to be delivered to said mapping system.

24. The system of claim 17, wherein said source data corresponds to a set of insured properties and respective geographical locations.

* * * * *